United States Patent
Kane et al.

(10) Patent No.: US 9,980,101 B2
(45) Date of Patent: May 22, 2018

(54) INTEGRATED SYSTEMS AND METHODS PROVIDING SITUATIONAL AWARENESS OF OPERATIONS IN AN ORGANIZATION

(71) Applicant: Intrepid Networks, LLC, Clermont, FL (US)

(72) Inventors: Brittin Kane, Clermont, FL (US); Joseph Daniel McCall, Sanford, FL (US); Joshua Witter, Vestal, NY (US); Jason Alan Stonebraker, Orlando, FL (US)

(73) Assignee: Intrepid Networks, LLC, Clermont, FL (US)

( * ) Notice: Subject to any disclaimer, the term of this patent is extended or adjusted under 35 U.S.C. 154(b) by 192 days.

(21) Appl. No.: 14/648,076

(22) PCT Filed: Nov. 27, 2013

(86) PCT No.: PCT/US2013/072260
§ 371 (c)(1),
(2) Date: May 28, 2015

(87) PCT Pub. No.: WO2014/085605
PCT Pub. Date: Jun. 5, 2014

(65) Prior Publication Data
US 2015/0334207 A1 Nov. 19, 2015

Related U.S. Application Data

(60) Provisional application No. 61/730,660, filed on Nov. 28, 2012.

(51) Int. Cl.
*G06F 15/16* (2006.01)
*H04W 4/08* (2009.01)
(Continued)

(52) U.S. Cl.
CPC ............. *H04W 4/08* (2013.01); *H04L 63/302* (2013.01); *H04L 67/1097* (2013.01); *H04L 67/42* (2013.01)

(58) Field of Classification Search
CPC ... H04L 63/302; H04L 67/1097; H04L 67/42; H04W 4/08; G06N 3/0454; G06N 99/005; G06N 3/005; G08B 21/02
See application file for complete search history.

(56) References Cited

U.S. PATENT DOCUMENTS 4,675,656 A 6/1987 Narcisse
4,785,291 A 11/1988 Hawthorne
(Continued)

OTHER PUBLICATIONS

GeoSuite, Because Every Second Counts, http://gdc4s.com/geosuite?taxonomyCat=131, p. 1-2 Apr. 2012.
(Continued)

*Primary Examiner* — Moustafa M Meky
*Assistant Examiner* — Kidest Mendaye
(74) *Attorney, Agent, or Firm* — Ferdinand M. Romano

(57) ABSTRACT

A system which comprises a series of native applications, suited to run on mobile devices, and a series of web-based applications for which functionality and processing are optimized. The native applications and the web-based applications are coordinated to optimize processes of acquiring, storing and disseminating data for speed, integrity and security.

13 Claims, 26 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 5,396,227 A | 3/1995 | Carroll | |
| 5,552,772 A | 9/1996 | Janky | |
| 6,917,801 B2 | 7/2005 | Witte | |
| 6,996,402 B2 | 2/2006 | Logan | |
| 7,102,493 B1 | 9/2006 | Coppinger | |
| 7,502,797 B2 | 3/2009 | Schran | |
| 7,855,935 B1 | 12/2010 | Lauder | |
| 7,873,349 B1 | 1/2011 | Smith | |
| 7,936,262 B2 | 5/2011 | Derrick | |
| 8,018,334 B1 | 9/2011 | DiMartino | |
| 8,035,503 B2 | 10/2011 | Partin | |
| 8,253,560 B2 | 8/2012 | Howard | |
| 8,285,667 B2 | 10/2012 | Jaros | |
| 8,433,508 B2 | 4/2013 | Husain | |
| 8,643,486 B2 | 2/2014 | Hess | |
| 8,704,657 B2 | 4/2014 | Huang | |
| 8,744,745 B2 | 6/2014 | Pudar | |
| 8,947,222 B2 | 2/2015 | DeLuca | |
| 9,063,782 B2 | 6/2015 | Tennant | |
| 2002/0135801 A1* | 9/2002 | Tessman, Jr. | G06F 17/30265 358/1.15 |
| 2002/0177428 A1 | 11/2002 | Mendard | |
| 2002/0194351 A1 | 12/2002 | Nishimura | |
| 2004/0100868 A1 | 5/2004 | Patterson, Jr. | |
| 2004/0139351 A1 | 7/2004 | Tsang | |
| 2004/0165789 A1* | 8/2004 | Ii | H04N 19/176 382/299 |
| 2004/0192329 A1 | 9/2004 | Barbosa | |
| 2005/0049785 A1 | 3/2005 | Vergin | |
| 2005/0057359 A1 | 3/2005 | Coffey | |
| 2006/0068752 A1 | 3/2006 | Lin | |
| 2007/0005539 A1 | 1/2007 | Bergman | |
| 2007/0255147 A1* | 11/2007 | Drew | A61B 5/0476 600/509 |
| 2008/0101329 A1 | 5/2008 | Richards | |
| 2008/0143582 A1 | 6/2008 | Park | |
| 2008/0147821 A1* | 6/2008 | Dietrich | G06F 17/30206 709/216 |
| 2008/0155529 A1* | 6/2008 | Kang | G06F 9/4415 717/174 |
| 2008/0168152 A1 | 7/2008 | Weizman | |
| 2008/0174492 A1 | 7/2008 | Kurokawa | |
| 2008/0307498 A1* | 12/2008 | Johnson | G06F 21/6218 726/3 |
| 2009/0222896 A1 | 9/2009 | Ichikawa | |
| 2010/0064054 A1 | 3/2010 | Karlsson | |
| 2010/0145678 A1 | 6/2010 | Csoma | |
| 2011/0046920 A1 | 2/2011 | Amis | |
| 2011/0046970 A1 | 2/2011 | Fontenot | |
| 2011/0169633 A1 | 7/2011 | Lauder | |
| 2011/0179380 A1 | 7/2011 | Shaffer | |
| 2011/0306326 A1 | 12/2011 | Reed | |
| 2012/0087212 A1 | 4/2012 | Vartanian | |
| 2012/0154141 A1 | 6/2012 | Piccolo | |
| 2012/0203836 A1* | 8/2012 | Nishimura | G06F 9/5027 709/204 |
| 2012/0275766 A1 | 11/2012 | Woodward | |
| 2013/0084896 A1 | 4/2013 | Barkie | |
| 2013/0202120 A1 | 8/2013 | Bickel | |
| 2013/0332856 A1* | 12/2013 | Sanders | G06F 3/0481 715/753 |
| 2014/0033266 A1 | 1/2014 | Kim | |
| 2014/0059594 A1 | 2/2014 | Stein | |
| 2014/0087769 A1 | 3/2014 | Nath | |
| 2014/0189850 A1 | 7/2014 | Marshall | |
| 2014/0203908 A1 | 7/2014 | Miasnik | |
| 2014/0285341 A1 | 9/2014 | Gitau | |
| 2014/0364081 A1 | 12/2014 | Rauner | |
| 2015/0199596 A1 | 7/2015 | Akasaka | |
| 2015/0199896 A1 | 7/2015 | Estes | |
| 2015/0249904 A1 | 9/2015 | Weiss | |
| 2015/0359013 A1 | 12/2015 | Krizik | |
| 2016/0110991 A1 | 4/2016 | Hunter | |
| 2017/0105108 A1 | 4/2017 | South | |

OTHER PUBLICATIONS

Dragon Force, Fight Smarter, http://www.darkontas.com/, p. 1-2, Nov. 4, 2012.

Kleinsmith, "Gunshot Detection Application for Mobile Phones" University of the Western Cape 2010, Sep. 2010, p. 1-20.

* cited by examiner

| MANAGE USERS | MOBILE UPDATES | | | | USER LICENSES: 13/300 |
|---|---|---|---|---|---|

MANAGE USERS

⊕ ADD USER

| LAST NAME | FIRST NAME | BADGE/EMP # | USER TYPE | AUTHORIZATION |
|---|---|---|---|---|
| CLAIMSTAND | DOUG | 2143512 | COMMAND | SUPER ADMINISTRATOR |
| DUDE | AVERAGE | 834589 | NON-COMMAND | COMMAND |
| DUDE 2 | AVERAGE | 123987 | NON-COMMAND | COMMAND |
| FEDER | DOUG | 122333 | COMMAND | COMMAND |
| FEDERER | BRETT | 112333 | NON-COMMAND | TACTICAL |
| FREELY | ISSAC-PAUL | 8932 | NON-COMMAND | TACTICAL |
| HENRETTY | MARTIN | 131345 | NON-COMMAND | TACTICAL |
| KANE | BRITT | 9864933 | COMMAND | SUPER ADMINISTRATOR |
| DUDE | JACK | 1919 | NON-COMMAND | COMMAND |
| ONE | GHOST | GH1 | GHOST | GHOST USER |
| REDMAN | BILL | 6594978 | NON-COMMAND | COMMAND |
| SCHMORDE | JIM | 7652435 | COMMAND | SUPER ADMINISTRATOR |
| WINSLOW | JASON | 4352652 | COMMAND | SUPER ADMINISTRATOR |

ISSAC-PAUL FREELY

USERNAME: ipfreely@stingtrial.org
AUTHORIZATION: TACTICAL
EMPLOYEE #: 8932
USER TYPE: NON-COMMAND
ASSIGNED: K-9

⊞ EDIT USER
⊕ CHANGE PASSWORD
⊖ DELETE USER

*FIG. 3a*

| MANAGE USERS    MOBILE UPDATES | USER LICENSES: 14/300 |

ADD USER

*USERNAME (MUST BE A VALID EMAIL ADDRESS)
[                    ]

*PASSWORD
[                    ]

PASSWORD REQUIREMENTS:
o MUST BE A MINIMUM OF 8 CHARACTERS IN LENGTH.
o MAY NOT CONTAIN DICTIONARY WORDS OR PROPER NAMES.
o MAY NOT BE THE SAME AS YOUR USERNAME.
o MAY NOT BE IDENTICAL TO YOUR PREVIOUS 10 PASSWORDS.

*CONFIRM PASSWORD
[                    ]

*FIRST NAME
[                    ]

*AUTHORIZATION
[ SELECT      ▷ ]

*LAST NAME
[                    ]

*ASSIGNED
[ SELECT      ▷ ]

*BADGE/EMPLOYEE #
[                    ]

*USER TYPE
[ SELECT      ▷ ]

*REQUIRED INFORMATION

[ SAVE ]    [ CANCEL ]

FIG. 3b

MANAGE USERS    MOBILE UPDATES            USER LICENSES: 14/300

EDIT USER jmehoff@trialeast.gov

*FIRST NAME
JACK

*LAST NAME
MEHOFF

*AUTHORIZATION
COMMAND ▷

*ASSIGNED
PATROL ▷

*BADGE/EMPLOYEE #
1919

*USER TYPE
NON-COMMAND ▷

*REQUIRED INFORMATION

CANCEL    SAVE

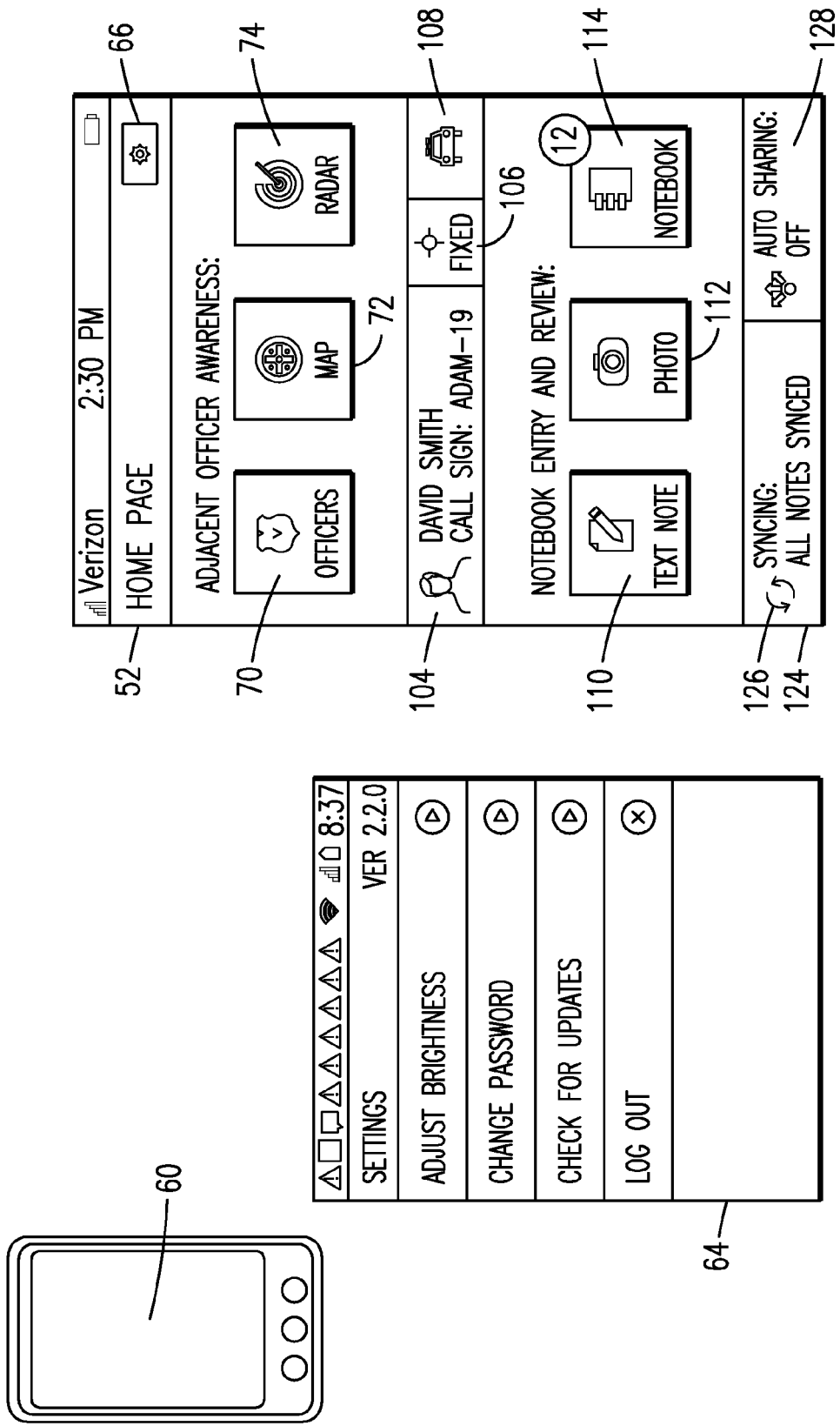

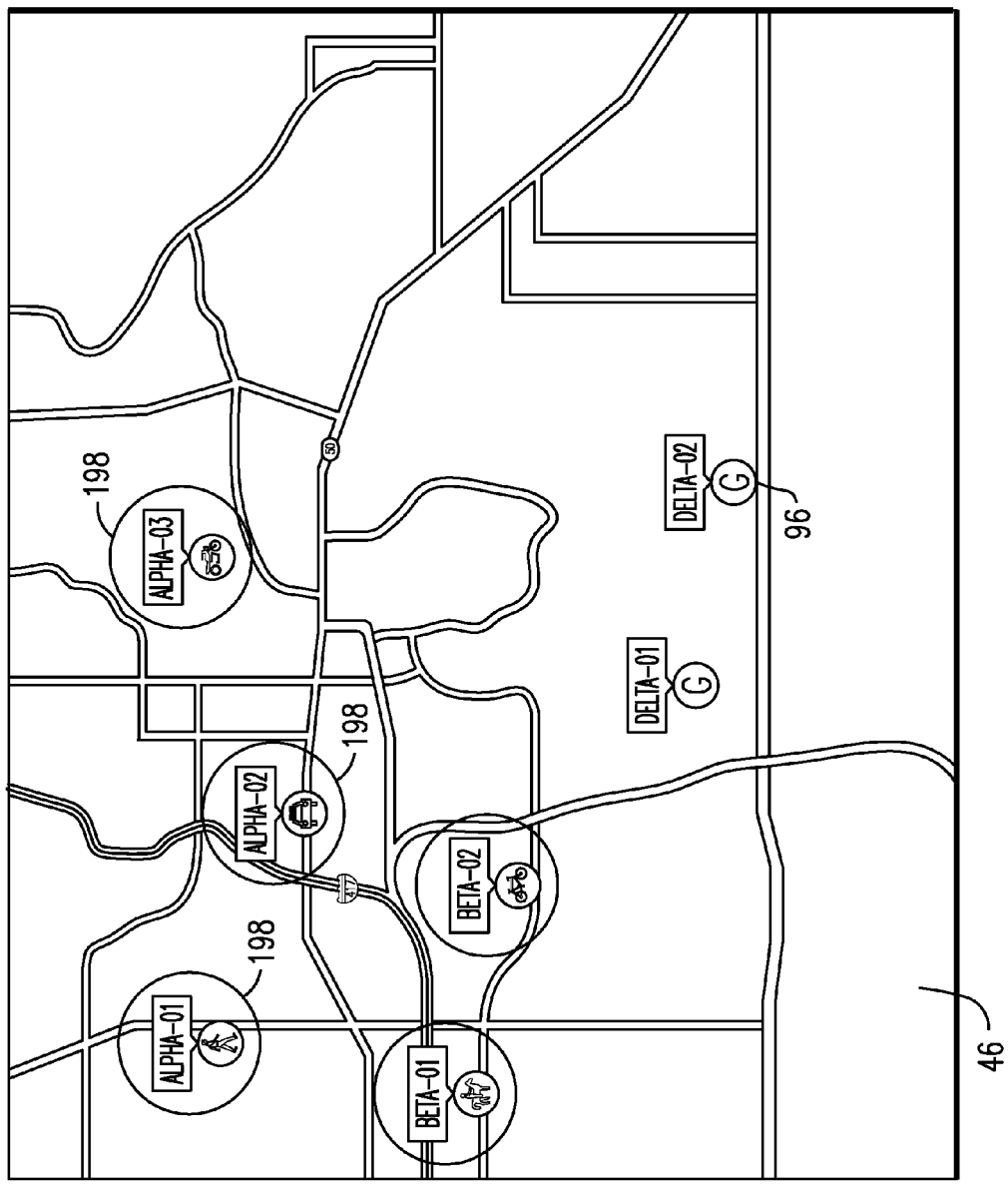
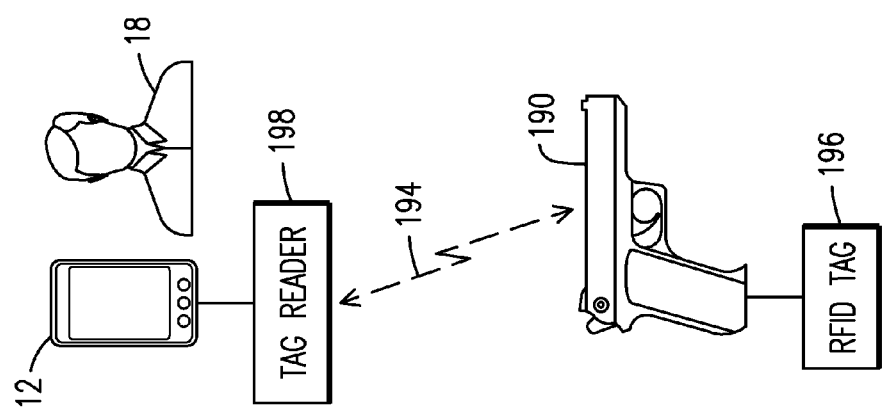
FIG. 12

SEPTEMBER 9, 2012 AT 3: 08 PM
SAMPLE: SUSPICIOUS PACKAGE
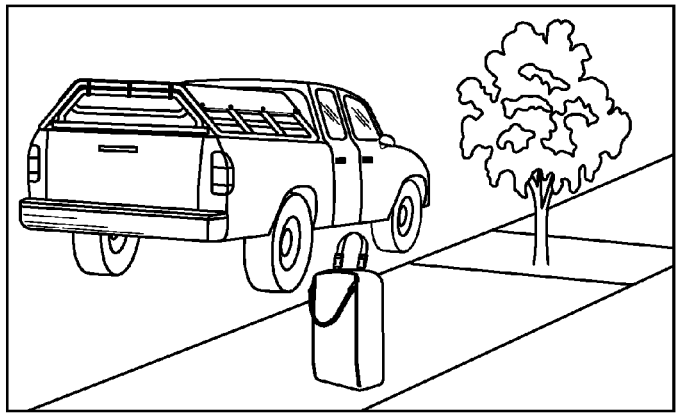
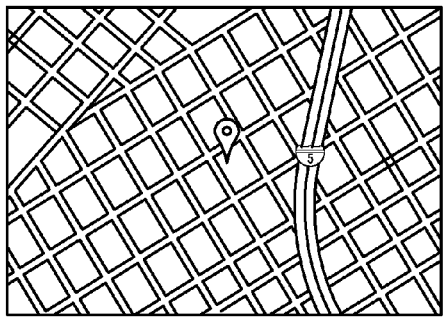
FILE INFO:
CAPTURE DATE: SUN-SEP 9, 2012
CAPTURE TIME: 3:08 PM
UPLOADED: SEP 9, 2012 AT 3:08 PM
DEVICE ID: 99000118970350
OFFICER INFO:
OFFICER: BRIT KANE
BADGE: 1010
LOCATION INFO:
LAT/LNG: 47.610945,-122.333937
ACCURACY: SEP 9, 2012 AT 3:08 PM
LATENCY: 0s
POSITION INFO:
AZIMUTH: 244.328125 DEGREES
PITCH: -20.703125 DEGREES
ROLL: -4.234375 DEGREES
*FIG. 14*

FIG. 15

INTEGRATED SYSTEMS AND METHODS PROVIDING SITUATIONAL AWARENESS OF OPERATIONS IN AN ORGANIZATION

RELATED APPLICATIONS

This application claims priority to U.S. Provisional Patent Application Ser. No. 61/730,660, filed Nov. 28, 2012 and is related to: U.S. patent application Ser. No. 13/671,961 "System and Method for Situational Awareness" filed 8 Nov. 2012 and U.S. Provisional Patent Application No. 61/724,048 "System and Method for Detecting and Analyzing Near Range Weapon Fire" filed 8 Nov. 2012, each of which is incorporated herein by reference.

FIELD OF THE INVENTION

The invention relates to organizations and, more particularly, to situational awareness, command and control, coordination of information among personnel, acquiring and preserving integrity of information and improving the safety and efficiency of an organization's operations. Features of the invention are especially applicable to law enforcement and Public Safety operations, and are described in this context but, more generally, the invention facilitates organizational operations in public, military and private sectors.

BACKGROUND

Commonly, law enforcement operations have a fixed set of assets which operate independently. Although some of the assets generate information vital to successful law enforcement operations, it is desirable to provide even more information to enhance performance and efficiency or improve the safety of officers. Systems according to the invention not only generate more useful information, but also make that information more broadly available in an optimal manner with the goal of providing greater utility to members of the operation. Law enforcement operations would benefit from an ability to generate more situational information and make that information immediately available to all members of the operation who can potentially use the information to more effectively perform their line or supervisory duties. In many instances, officers are at risk for encountering unanticipated dangers which cannot be easily monitored and it is desirable to provide improved techniques for more comprehensive monitoring, more timely generation of alerts and improved command and control in these circumstances.

Many patrol officers spend a large percent of duty time in association with an assigned patrol vehicle. Typically, the patrol vehicle serves as a mobile center for enhanced communication, information acquisition, generation of GPS information and video monitoring. However, when the officer steps out of a patrol vehicle far fewer resources are at hand. In addition, many officers never have access to a vehicle, such as those assigned to crowd control or SWAT, and officers patrolling on bicycles, walking a beat or performing undercover activities. An officer normally carries only a service radio, which is a primary means of voice communications, a pager and perhaps a personal or department owned mobile telephone. Thus, from the standpoint of safety, it is understandable that officers should feel most secure when inside a vehicle rather than when performing duties outside of the vehicle. Yet, much police work is done on foot and away from a vehicle.

Responsive to a need to provide and share more useful information in a timely manner, a novel system employs an integrated architecture of networked equipment and software operations with which officers can obtain timely information about other officers and personnel. In one embodiment, the information is displayed as text and graphic presentations, including use of icons and a variety of map views, which keep members of a group informed about, for example, the status of variable tactical dispositions of other members of the organization. The system also enables acquisition and display of proximity and directional awareness (e.g., distances and directions relative to other officers) and provides officers with rapid awareness of critical events such as the occurrence of gunfire in the presence of another officer. The system makes use of sensors to rapidly detect and alert members of the organization about life threatening incidents in the presence of one or more other members. This enables alerted members to quickly initiate the most rapid and informed responses possible. Another feature of the system is a distributed arrangement for secure collection and retention of information generated by members of an organization (e.g., law enforcement officers, a security force, militia or first responders), including time stamped notes and captured multimedia data. This and other information can be disseminated to other members of the organization immediately, can be later used for generating reports, and can be transferred to secure databases for preservation of legal evidence.

SUMMARY OF THE INVENTION

According to the invention, systems and methods are based on a distributed software architecture enabling an organization of users to communicate real time information effectively while enabling supervisors to perform command and control functions. In one embodiment a network-based system includes a combination of server based applications and user based applications which cooperatively operate to perform functions which provide situational awareness to members of an organization. The embodiment comprises both native user applications for smart phones and tablet computers and web based applications for laptop, desktop and tablet computers, as well as smart phones and other terminals. A core functionality of this system is rapid provision of situational awareness among users logged into the system. Embodiments of the systems and methods enable rapid collection, sharing and analysis of various information obtained from locations about which the smart phones are positioned. This brings enhanced capability into environments which may be characterized by high levels of threat, requiring quick reaction or covert actions. In addition to applications in law enforcement domains, the invention is useful to emergency response needs, military operations and activities performed by commercial security personnel. A feature of the invention is that numerous applications which enhance situational awareness operate with little or no active involvement of personnel in the field environment. In many instances, the applications automatically collect, analyze and display information which is easy to visualize. In some instances the applications automatically transmit data through the network from one member of a group to one or more other members.

In one series of embodiments, a method is described for providing information to one or more members in a group of users. Each user has a hand-held device which communicates as a client to a server in a network via a rf link, the hand-held devices each having a volatile storage medium for temporary data storage, a display for viewing information present in the device memory circuit, a device processor and a non-volatile storage medium for data storage for which access to read data from and write data to the device non-volatile storage medium is under the control of the device processor, the server having a processor and a non-volatile server storage medium for which access to read data from and write data to the non-volatile server storage medium is under the control of the server processor. The method includes creating data on a first of the hand-held devices with the data written to the volatile storage medium of the first device or to the non-volatile storage medium of the first device and displayed to the user after creation. After writing the data to the volatile storage medium of the first device or the non-volatile storage medium of the first device, the data is uploaded to the server and the server processor writes the data to the non-volatile server storage medium. After uploading the data to the server, further access to place the data in the volatile storage medium of the first device for viewing on the device display is limited by requiring, each time a user in possession of the first device seeks to present the data on the display of the first device for viewing, that the data only be accessed from the non-volatile storage medium under the control of the server processor and sent to the volatile storage medium of the first device without writing of the data into any non-volatile storage medium directly accessible by the device processor. The data received by the first device from the server can be viewed on the device display but cannot be stored in any non-volatile storage medium in the first device.

In one embodiment of a method for creating and sharing information in a network, the network has a server and a plurality of clients in the form of hand-held devices, and each device includes a processor, a volatile storage medium accessible via the device processor for temporary data storage, a non-volatile storage medium accessible via the device processor for data storage and a touch screen display. The method includes coupling the devices to the server via a rf link, providing on at least a first of the devices a first screen presented on the display comprising a series of icons, a first of the icons providing access to a text entry application, for creating text notes, or an image capture application, the text entry application or image capture application enabling creation of data by a user of the first device, which data is viewed on a second screen presented on the display of the device, and providing on the first of the devices, during or after data creation, temporary storage of the data displayed on the second screen. After data creation on the first device, the method includes providing, via the touch screen display, an option to transfer the created data from the device to the server, providing via the touch screen display, after data creation on the first device, an ability to select specific ones of the other devices to which the created data received by the server is to be made available and providing the server with an identification of the selected devices wherein, provided the user transfers the created data from the first device to the server, the first device automatically removes the data from all non-volatile storage accessible to the user via the device processor. A notification is sent from the server to each of the other selected devices indicating that access to the created data is available to that selected device for viewing. Upon the server receiving a request from one of the other selected devices, the data are sent from the server to said one of the selected devices.

In another embodiment, a method is provided according to which a server in a network provides data created by a first client in the network to other clients in the network for viewing. The server includes a processor which writes information to both volatile memory and non-volatile storage. The method includes using the server processor to write the data created by the first client to the non-volatile storage so that, upon request, the server accesses and transfers to any one of the clients the data created by the first client and written to the non-volatile storage. The non-volatile storage is the sole repository of the data created by the first client so that every time any one of the clients views the data created by the first client the data is only accessed by the client through a network connection to the server.

A system is provided for managing data on a server, the server having server processor and a non-volatile storage associated therewith. A plurality of clients are in communication with the server over a network, each of the clients having a device processor and a volatile and non-volatile storage associated therewith. The server processor is adapted to: receive data from a respective client in the network, wherein the client is adapted to delete the data from its local storage once received by the server; store the data on the server in the non-volatile storage associated with the server, wherein the server functions as a sole repository for the data; and provide access to the data by authorized ones of the plurality of clients. The data accessed by the clients remains volatile on the client and is prevented from being written to non-volatile storage associated with the client.

Also according to an embodiment of the invention, a method is provided for generating information for isolated viewing by one or more members in a group of users. Each user has a hand-held device which communicates as a client to a server in a network via a rf link. The hand-held devices each have a volatile storage medium for temporary data storage, a display for viewing information present in the device memory circuit, a device processor and a non-volatile storage medium for data storage for which access to read data from and write data to the device non-volatile storage medium is under the control of the device processor. The server has a processor and a non-volatile server storage medium for which access to read data from and write data to the non-volatile server storage medium is under the control of the server processor. The method includes: running a first software application on a first of the devices by which the device is logged into a closed network as a client for the purpose of exchanging data with a server in the network, launching a second software application from a screen page generated on the display by the first application, and creating data on the first device with the second software application running on the device processor and as launched from the screen page generated on the display by the first application. The second application is accessible to the user of the first device in at least a first data storage mode. The data (i) are presented on the display during or after creation and (ii) are written to a first block of data storage cells in the non-volatile storage medium of the first device which are not accessible by the user except by launching the second software application from a screen presented on the display which is generated by the first application.

A related method includes running a first software application on a first of the devices by which the device is logged into a closed network as a client for the purpose of exchanging data with a server in the network, launching a second software application from a screen page generated on the display by the first application, and creating data on the first device with the second software application running on the device processor and as launched from the screen page generated on the display by the first application wherein the second application is accessible to the user of the first device in at least a first data storage mode and wherein the data (i) are presented on the display during or after creation and (ii)

are written to a first block of data storage cells in the volatile storage medium of the first device which are not accessible by the user except by launching the second software application from a screen presented on the display which is generated by the first application.

According to another embodiment, a method of sharing information between one or more hand-held devices includes storing data locally on a storage medium of a first device of the hand-held devices, wherein the data locally stored is initially accessible for display on the first device; uploading the data to the server adapted to store the data in a non-volatile format remote from the first of the hand-held devices; preventing, via the device processor, further access to the data locally stored on the first device; and retrieving the data stored on the server for display on one or more of the hand-held devices, wherein the server-retrieved data remains volatile on the one or more of the hand-held devices.

Also according to another embodiment of the invention, in a network comprising a server and a plurality of clients, a method for covertly acquiring data with a first software application running on a first one of the clients, for the first software application there may be an image which (i) by the nature of the image as displayed on a screen of a client, overtly exhibits a self-evident association with the first software application, (ii) specifically identifies the first software application and (iii) indicates when the first software application is running on the client, The method includes providing a hand-held device as the first client, the hand-held device having a processor, a storage medium, a touch screen display, rf communications capability and an ability to run the first software application in at least a first configuration where (i) in order to run the first software application in the first configuration a log-in must first be input to the client, and (ii) when running the first software application in the first configuration, no such image which overtly exhibits a self-evident association with the first software application can be viewed on the display to both identify the first software application and indicate that the first software application is running on the client. The method includes initiating monitoring and communicating to other clients information about the activity associated with the first client by:
  (i) displaying a feature on a screen accessible with the touch screen display, the feature having no self-evident association with the first software application, wherein the screen displaying the feature is responsive via the touch screen display to application of a gesture or key sequence;
  (ii) presenting a log-in screen or a prompt to run the first software application in the first configuration by inputting via the touch screen display a predefined gesture or key sequence after the feature is first displayed;
  (iii) performing the log-in on the displayed log-in screen; and
  (iii) after performing the log-in, initiating the running of the first software application according to the first configuration without providing display of any image which specifically identifies the first software application and indicates that the first software application is currently running on the client.

According to another embodiment, in a method is provided for covertly terminating execution of program steps in application software running on a hand-held electronic device of the type having a processor, a storage medium, a touch screen through which termination of program execution by the processor is had with gestures made on or near the screen by one or more fingers, and a first software application containing first program steps stored in the storage medium and executable on the processor by making one or more gestures on or near the screen, the first program steps including display of one or more screens of graphic or text information relating to subject matter of the first application. The method includes enabling access to control termination of the second program steps by initiating execution of the first program steps, this causing display of a screen of the graphic or text information. Execution of the second program steps is terminated by making one or more first additional gestures on or near the screen while the graphic or text information is displayed on the screen.

In still another embodiment according to the invention there is provided a method for determining the range of fire for a weapon with a system including a server in a network which receives data from a mobile client in the network. The client is in the possession of a user proximate the weapon. The method includes acquiring identification information for the weapon with the mobile client by reading a tag associated with the weapon with the mobile client, transmitting the weapon identification information to the server, acquiring a predetermined range of fire for the weapon from a database; and creating a common operating picture which includes the location of the client and a circle centered about the client location. The circle indicates a limit in the weapon firing range in a map view presentation or radar view presentation of the common operating picture. Based on calculations the view may also indicate whether the weapon firing range is sufficient to reach a specific target area shown in the view.

BRIEF DESCRIPTION OF THE DRAWINGS

These and other features, aspects, and advantages of the present invention will become better understood when the following detailed description is read with reference to the accompanying drawings in which like characters represent like parts throughout where:

FIGS. 3a, 3b and 3c illustrate the basic functionality of a System Administration application.

FIG. 5 illustrates the home screen and the settings menu of the Situational Awareness Mobile application.

FIG. 12 illustrates a method for determining range of weapon fire in a Situational Awareness Map/Roster application.

FIG. 14 illustrates a sample report output from the Situational Awareness Information Manager application.

FIG. 15 illustrates the Share Notes page within the Situational Awareness Information Manager application.

DETAILED DESCRIPTION OF THE INVENTION

Figure 1:
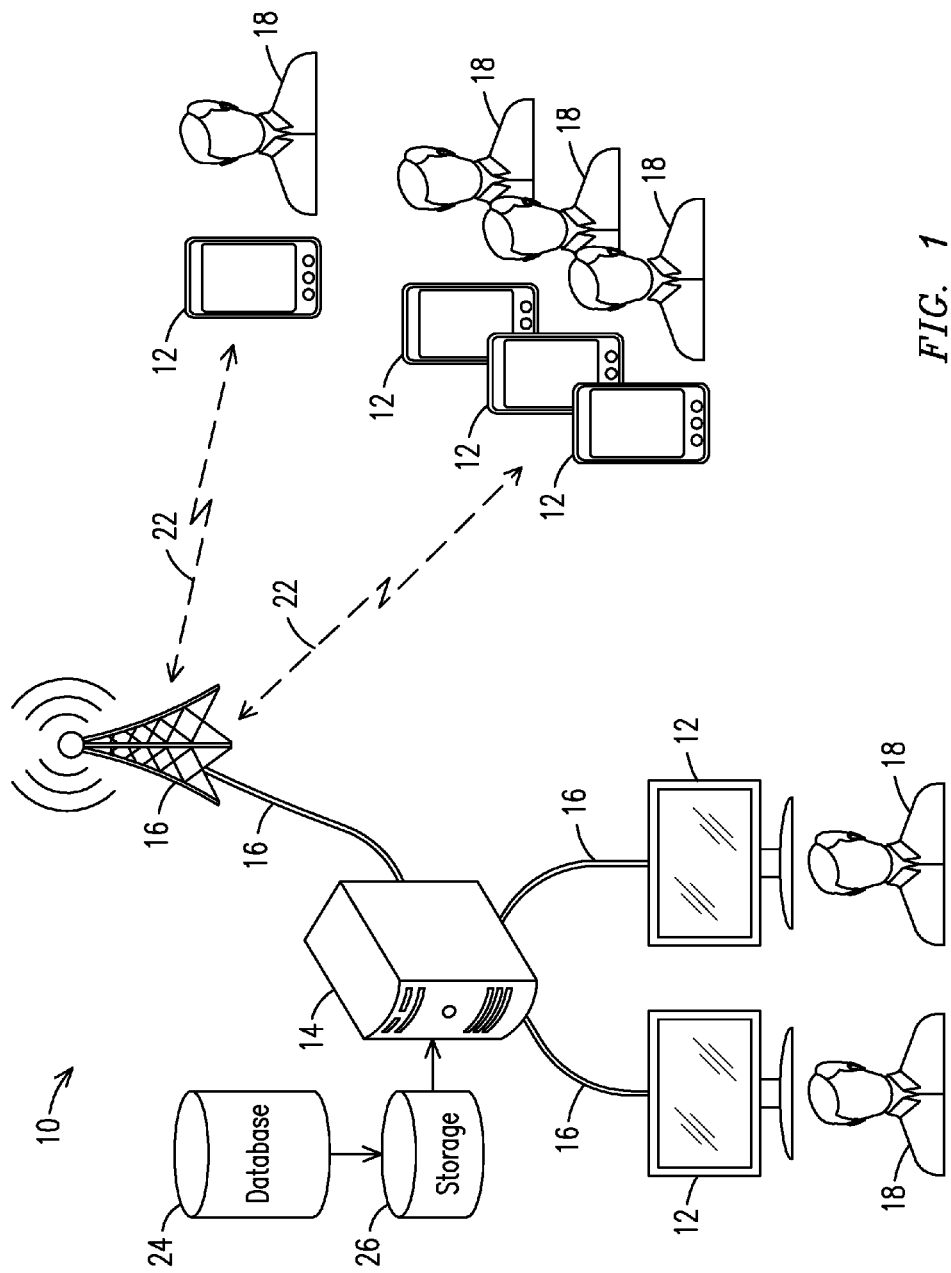
FIG. 1 illustrates a situational awareness system with both static and mobile client devices connected to a server.

According to an embodiment of the invention, a situational awareness system 10, illustrated in FIG. 1, is deployed in an organization which comprises a group of static and mobile clients 12. The clients may include handheld devices (e.g. smart phones, tablets, tactical radios, etc), also referred to as mobile clients, and notebook, laptop and desktop computers in an Internet Protocol (IP) network architecture. Each client 12 is linked to a server 14 in a network 16. The server may be centralized or distributed. System administration is server based. As used herein, the terms client and client device refer to a processor-based device on a node of the network. The term user refers to a person in the organization who is logged into the network through a client 12. The server 14 stores complete profiles of all users 18 in the network 16, performs calculations necessary for whole system performance and stores data collected or created by the clients in a database 24. Users 18 who are mobile can remotely receive and transmit information and alerts via clients 12, e.g. using smartphones, laptops and tablets, through wireless network links 22, e.g., an RF or WiFi link, while users 18 who are stationary can receive and transmit information through standard wired network interfaces. Many of the clients 12 may have touch-screen interfaces, e.g. smartphones, tablets and some laptop computers. The server includes storage 26 in which the database 24 is maintained. Information in the database 24 is accessible to the clients through the server 14 in order to access and share information provided by the users among the users. Information that may be transmitted and received by clients and/or stored within the server database includes, but is not limited to, user profile information, user preferences, location data, text notes authored by the users 18 and photographs.

The system 10 may operate on any combination of wireless and wired network segments as long as the network connections are Internet Protocol (IP) based, e.g. Cellular, Bluetooth, WI-FI, Ethernet, etc. The term situational awareness as used herein refers to information made available through the network 16 to members of an organization, which information raises awareness about a condition relating to a member of the organization or a function of the organization.

Situational Awareness mobile application refers to software embodiments which run on mobile client devices. In the disclosed embodiments these applications provide: an environment under which special modes of other applications (including applications commonly provided on mobile clients) may be run, exclusive means for transferring data between the client and the server, and local computations on data for graphic display of the data for the benefit of the user 18 (e.g., when viewing Common Operating Picture). According to the invention, Situational Awareness mobile applications are chosen when one or more software functions can most optimally be performed locally, i.e., running on the mobile client devices, while other software application functions may most optimally be performed by running the application on the server, often while the client is directly linked to the server through a browser. Smart phone and tablet computers may also operate the server-based applications utilizing an internet browser. This multi-processor distributed architecture enables a heretofore unknown level of enhanced information reporting, including real time awareness of the most current status of a user 18 through one or more awareness resources. Real time awareness refers to timely awareness of information to members of the organization, e.g., via displays on the mobile clients or other computers, i.e., in a relatively rapid manner, to facilitate optimal use of information, including expedient responses to urgent situations.

The system 10 may utilize the IP address of the user's client device, e.g. smartphone, computer, etc., and the URL of the server to create a network connection through which data is shared between the two endpoints. Generally, with the combination of an IP-based network and a cellular system, persons logged into the situational awareness system 10 have access to send and receive time critical data via smart phones or other mobile devices such as tablets, and wired devices. Other wireless systems such as WI-FI or Bluetooth networks can also provide connectivity when a client is not connected to the cellular system.

The following system specifics are exemplary. For the disclosed embodiments the software architecture for sending and receiving information is a client-server distributed networking architecture utilizing cloud based computing methodologies over standard HTTP requests. A Representational State Transfer (REST) based service model is utilized which enables only client devices to initiate requests to the server using HTTP for both browser and mobile applications. Other appropriate standard signaling interfaces may be used in addition to HTTP as necessary. This REST services model can serve entire interfaces, partial interface elements, and JSON or XML data as necessary for browser applications and domain specific business logic, data validation, and the data repository access for mobile applications. Domain concerns handled by these services can include user authentication, user profile management, location tracking, messaging, etc. The client device forms a network socket connection with the server by initiating a service request to the server and locating the server by the URL address. The server authenticates the client device first with a series of username, password or security token acknowledgements and then processes the service request from the client. When information is sent back to the client, the IP address of the device is contained in the request for the service and is maintained while the socket connection is open. As a result, the server only requires the IP address of the client when a REST based service is initiated. Hence, dynamically allocated IP addresses are acceptable for the client devices with this architecture.

Figure 2:
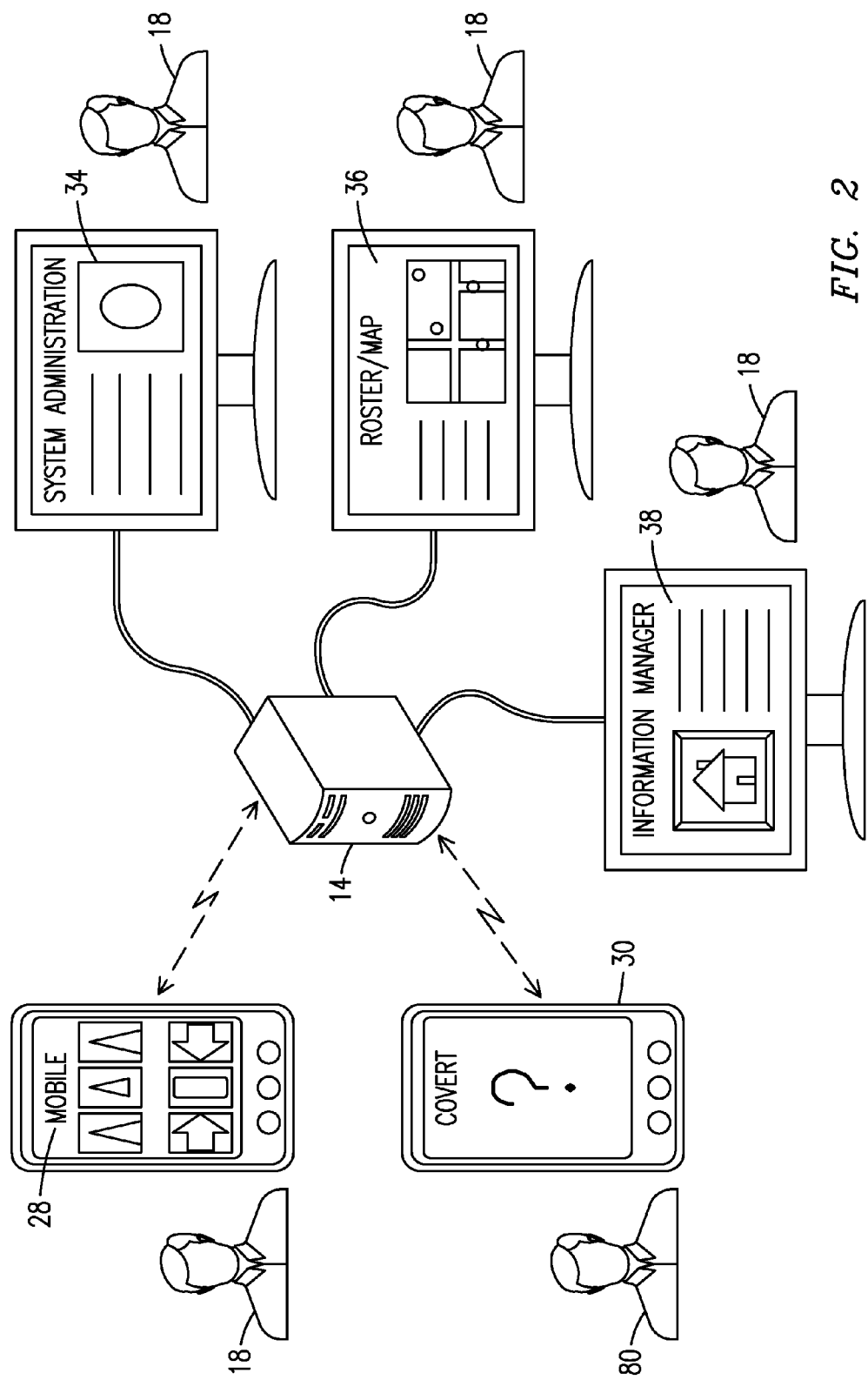
FIG. 2 illustrates exemplary software applications of the situational awareness system.

The server may be secured with a firewall appliance that can require VPN access, e.g., with all data within the database encrypted, and provide secure transmission using protocols such as TLP over HTTPS. A feature of the system 10 is that with the server 14 as the central coordinator, controlling access to the database 24, users who are not connected to the server through the IP network cannot receive information from other users or transmit information to other users in the system 10. Hence the system design can be used to control the flow of data and preserve the integrity of data created. FIG. 2 shows an embodiment of the situational awareness system 10 which includes a suite comprising two native mobile applications 28, 30 and three web based applications 34, 36, 38. A Situational Awareness Mobile application 28 and a Covert Mobile application 30 are exemplary native mobile applications which run on smart phones. A System Administration application 34, a Situational Awareness Map/Roster application 36 and a Situational Awareness Information Manager application 38 are exemplary browser based applications which operate on the server 14 or another network based computer system. Additional applications can be added to the situational awareness system 10 as more functionality is required by the user. Ghost users 80 utilizing the Covert Mobile application 30 contribute information to the situational awareness system 10 for the benefit of the users 18 but are not users 18 in the sense that they do not have access to information that is made available to the users 18. The suite of client-based software applications deployed in the system 10 is designed for a variety of mobile devices, including smart phones, tablet computers and tactical radios. Although the invention is described in the context of a smart phone it is to be understood that the invention can be practiced with other handheld devices running suitable operating systems, e.g., operating systems such as Android™, BlackBerry™, and iOS™ (the mobile operating system used in smart phones marketed by Apple Inc.). The situational awareness system web based applications 34, 36, 38 are accessible to the client devices with many common internet browsers on a wide variety of devices, including notebook computers and even via tablet computers having data connectivity to the internet, e.g., through a cellular network.

The situational awareness system 10 utilizes a minimal data architecture designed to provide additional security to the user 18 in the field. No data needs to be retained on the client devices and, in the disclosed embodiments, no data is permanently retained on the client devices. Thus, if a client device is lost or stolen, critical information is not available to an unauthorized individual attempting to access the device. Minimal permanent data stored within the phone includes very basic user profile information, e.g. first name, last name, call sign, etc. and various check flags for initialization states upon re-entering the application.

A feature of the situational awareness system 10 is that the client devices, e.g., smartphones, are not uniquely or permanently assigned to each of the users 18. Rather, the same mobile device may be shared among users at different times, e.g., during different shifts, or may be kept in reserve (inactive) for use on an ad hoc basis when additional mobile devices are distributed, e.g., during emergency situations. The unique identification numbers and telephone numbers of the mobile devices are only registered or assigned to a user upon login and are removed from the system upon logout. This capability can provide significant flexibility to the organization and lowers the cost of acquisition of the technology by minimizing the cost of hardware. This feature also provides additional security to the user 18 because phone numbers are never stored permanently on the phone or in the database 24 of the situational awareness system 10. In order to improve security using this particular client device sharing technique, an option can be provided to authenticate the user upon first use of the mobile device. An administrator application can provide this function and the smart phones can also be deactivated from a particular user upon completion of an operation using the phone.

In the illustrated embodiments histories of location data are obtained for each of the users 18 but are not saved in the system 10. Only current location data are placed in the server database. No location data is retained on the client device. Location data on the server database 24 are updated (i.e., over-written) immediately when new position data is received from the mobile client device. For each logged-in user 18, all location-based position data are completely removed from the database 24 when the user logs off the system 10 or chooses to turn off the location polling. Another embodiment allows for retention of stored location data (e.g., a time history of GPS data collection) to provide location histories of individuals and events. These histories may be useful for training, preparation of after-action reports, evidence or other needs.

An embodiment of the situational awareness system 10 includes the creation of text notes and photographs for retention in the database 24 and sharing. These data are uploaded from the client 12 to the network server and stored on the system for a limited time period. Storage of this data only in the database 24 minimizes theft, data tampering and loss of information in the event of a security breach or system failure. In one embodiment, a retention period renders the available data to be retrieved by the user only during a limited time period, e.g., a 30 day period, after being collected and written to the database 24. In another embodiment, the same data may be stored on the system 10 for an additional 30 days, but with access limited to a system administrator who has direct access to the system database 24, before being permanently deleted from the system database 24. These time periods are variable and can be modified for each organization by a system administrator. Use of the pre-determined data retrieval and storage periods ensures that if a security breach occurs, the entire evidence or information database of the department will not be compromised, since the data available at any one moment in time is for a limited time period, e.g. 30 days. According to another embodiment of the system 10, the photographic and text note data are stored permanently. This might be valuable for commercial users who do not have to secure evidence or report databases as might be required in a law enforcement or security organization to which they can transfer information from a situational awareness system.

Creation of a shared situational awareness capability among members of an organization (e.g. where the users are members of a law enforcement organization), begins with the formation of a closed user network for the organization. A user group consisting of members of the organization is created within the situational awareness server database 24. Initially, the database is populated with the organization name and attributes, such as the maximum number of members, the geographic headquarters of the organization, the time zone of the headquarters of the organization and the user profile for at least one member of the group. The system administrator may also delete the organization as appropriate. An additional browser application may be created to perform this initialization of the organization, modify attributes of the organization and delete the organization from the database so that a system administrator with direct access to the database is unnecessary.

The server 14 may support provision of services to multiple organizations, each running a system 10 on a different network. However, users of a network created for one organization cannot interact with the network created for another organization, i.e., the situational awareness system for each organization operates in a different closed network. The data for each of the organizations are in distinct locations within the server database 24. Unless it is desired to share information between organizations (e.g., among police, fire and medical organizations in the same unit of government) overlap is prevented by using data boundary software techniques to ensure the integrity of both the organization data and each user's data within each organization. To effect sharing of information between organizations, an embodiment of the situational awareness system 10 includes an architecture where disparate organizations of users can interact with users of another organization through the use of a bridging functionality where different organizations can decide to integrate certain functions or data between their respective systems 10 on a temporary or long term basis. This might be useful for a department which has several organizations contained within, which organizations normally function independent of one another but on occasion need to form a larger virtual system. As an example, a law enforcement department may have several organizational units, e.g. traffic and patrol, SWAT, narcotics, vice, crowd control, K-9, etc. that may need to conduct joint operations from time to time. This bridging capability is also useful for dissimilar departments to join and unjoin as appropriate for their operations such as might be necessary for a large multi jurisdictional response, e.g. various fire, law enforcement, HAZMAT, EMT organizations.

FIGS. 3a, 3b and 3c illustrate the basic functionality of the browser based System Administration application 34 which creates, maintains, updates and deletes initial user profiles within the group. A first time use of the situational awareness system 10 includes a process where the first user in the group for whom the user profile has been entered into the database is used to log into the System Administration application and populate all other users in the group in the database 24 to begin operation on the system 10. FIG. 3a illustrates the System Administration application home page 39 with a list of sample users. From the home page 39 users can be created, edited, deleted or their password changed. FIG. 3b illustrates the Add User page 40 within the System Administration application. The initial user profiles may be defined by the following fields: username, password, first name, last name, badge or employee, authorization level, assigned role and user type. Other embodiments of the system contain the option to add additional fields to enter data, e.g., shift, medical training, language proficiency, weapon type or other important user attributes relevant to the organization.

Each username associated with each organization supported by the situational awareness system 10 and used to log into the system 10 must be a unique identifier throughout the entire system. The username points each user to the particular organization (e.g., the correct law enforcement or fire group) within the system. Except as noted above, the system does not allow a user to access to any information associated with a different organization. In order to minimize the possibility of errors and confusion, the username can be the user's email address. The authorization level assigned to each user determines the level of access each user has to each of the applications. For example, supervisors may require access to different functionality than non-supervisors within the applications. Exemplary choices for the authorization field include: Tactical, Command, System Administrator, Super Administrator and CAD API Integrator. The CAD API Integrator level of authorization provides an authorization role as a special designator for a machine automated operation which facilitates placement of user data into an organization's other legacy systems, e.g. in law enforcement the Computer Aided Dispatch application. This allows machine to machine transfers of data useful to each of the systems.

The field "assigned role" within the situational awareness system 10 defines a particular job function for the user 18 within the organization, e.g. operator, medic, etc. The "assigned role" field may be used to color code assets (e.g., personnel by job function) on the map, to facilitate quick batch operations for sharing data and to otherwise sort users for sharing of data. The field "user type" may be utilized to sort a particular kind of user in operations, independent of the "assigned role", for use within applications, e.g. batch lists and groups. This also provides another level of access control to data and login to applications within the system. Choices for this field include Command, Non-Command and Ghost user. A user 18 with access to the System Administration application 34 can also modify all user profiles within an organization by utilizing the Edit User page 41 as illustrated in FIG. 3c.

Figure 4:
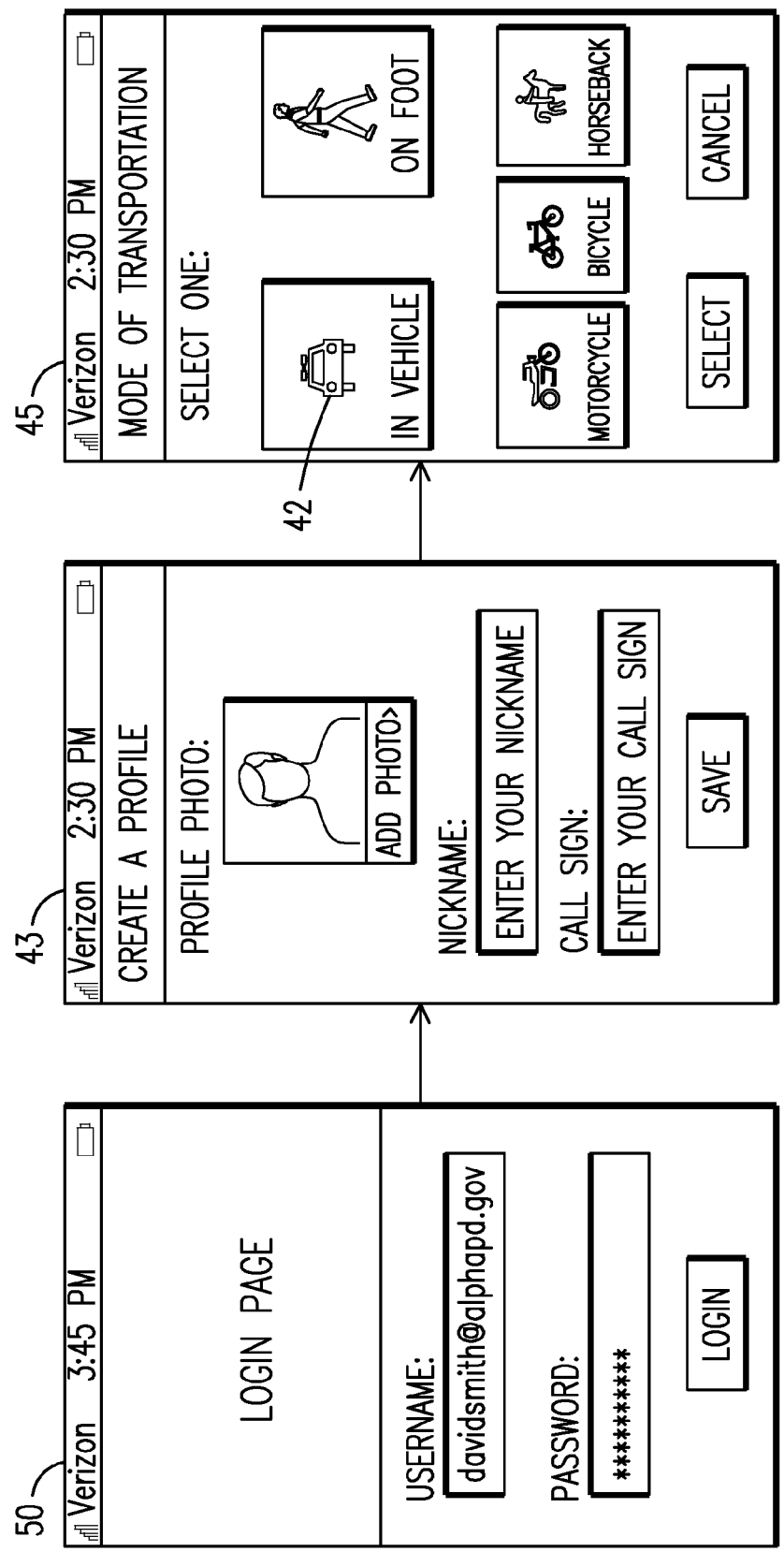
FIG. 4 illustrates a first time user profile of the Situational Awareness Mobile application.

Using the Situational Awareness Mobile application 28, residing on a mobile client (e.g., a smartphone), each user may complete his or her profile and begin mobile use of the system 10. Demonstrated in FIG. 4 is the initial login and profile completion process. At the time of the first login, a user enters the mobile application for the first time with an assigned username (e.g., email address) and password that were created in the System Administration application 34. After the user 18 is authenticated, the initial profile setup is completed through the application 28. In the initial profile setup the user adds a call sign to his or her profile. An option also exists on this setup screen to include a nickname and a personal photograph. The call sign may be of any length but, in operation, only the first 15 alpha-numeric characters will be displayed during system operation. After successful completion of this screen, the user then designates a transportation state on the next screen which is used to select a particular icon 42 for placement on a map 46, e.g., on foot, motor vehicle, bicycle, motorcycle or horse. The transportation state may also be used to calculate time of arrivals between two users, e.g. when an officer will arrive to provide backup. More generally, the transportation states could include boats, helicopters, airplanes and four wheel ATVs. This field could also be changed to a role within the organization which would imply a particular transportation state. The system 10 also includes the option to add additional fields for data entry in the first login process similar to that of the System Administration application 34, e.g., shift, medical training, language proficiency, weapon type or other important user attributes relevant to the organization.

After completion of these two screens, the user initialization is complete and these inputs do not need to be performed again. The user 18 need only provide user name and password information to a log-in screen 50 to enter into the system 10. Additionally, if the user logs in again for any future work period after performing a logout, e.g., for a shift, the username is stored in the client device (e.g., a smart phone) so that the user does not have to enter the username to effect log-in or other operations which require entry of a user name and password. Additionally if the user never logs out of the mobile application 28 (e.g., during a shift) the user will always be able to access the application without a username/password entry, even after the phone has been powered off and powered back on. After initial setup, anytime the user 18 successfully completes the log-in, the home page 52 of the Situational Awareness Mobile application 28 appears on the display 54 of the mobile client 12 indicating the application 28 is operating in the system 10.

From the home page screen 52 of the Situational Awareness mobile application 28, the user 18 can view and create information on the client 12. A feature of the Situational Awareness Mobile application 28 is the provision of a true Common Operating Picture (COP), i.e., a common visualization of important assets and information in a single view, which may be in a list format or a map view. This enables multiple users in the organization to view the same operational information. In the context of a law enforcement organization, all officers can visualize the same information in a common view of themselves as well as others in the organization. Another capability of the system 10 is the ability to collect, distribute and view critical information among a select group of users for sharing and retention. The information may be created by a user or shared by one user among other users.

The Situational Awareness Mobile application 28 is a native application for mobile devices which provides improved response times and enhanced user experience over a web application. Operating in the native mobile environment is advantageous. That is, the system 10 can perform complex computations on a local, i.e., mobile client, level to minimize network traffic and avoid speed limitations that would otherwise affect overall application performance. Use of local memory in the client device enables the system 10 to deploy or process large, resource intensive data operations in the mobile device, including setup information such as user lists and map data.

Another advantage of executing native applications is that capabilities not dependent on server interaction function independent of the network. Data generated locally can be temporarily stored on the mobile device and then uploaded to a network computer at a later time. The overall user experience can be optimized with this approach. In doing so, the application 28 can be customized for viewing presentation based on the exact screen size and mobile device functionality of each client, as opposed to a "one size fits all" approach typical of web applications which centrally process information and transfer results to mobile devices. Also, web applications, in general, are relatively slow and more prone to network service issues.

An exemplary view of the home page 52 of the Situational Awareness Mobile application 28 is illustrated in FIG. 5. The page presents the user 18 with eleven options to select from. Core functionality is accessed on the client device touch screen display 60 through six relatively large square buttons while the settings and secondary functions are accessed with smaller buttons. The settings menu 64 for the application is accessed by making touchscreen contact with a settings menu button 66, in the upper right hand corner of the page 52, containing an image of a sprocket. Within the settings menu 64, the user 18 may choose to change the password, adjust the screen brightness or receive updates for the application 28. The user can also logout of the application from this menu.

Three large buttons 70, 72, 74 on an upper half of the home page 52 provide access to positional and roster functionality of the application. Positional situational awareness is visualized through any of multiple display forms which indicate the location and status of officers within a predefined distance of the user 18. The display options represented by the three buttons 70, 72, 74, from left to right, are a list view 70v, a map view 72v and a radar view 74v as illustrated in FIG. 6. The user 18 can return to the homepage at any time by utilizing the home button 76, represented by 9 small squares. In the list view 70v, users 18 (e.g., officers) and ghost users 80 (as explained below) are sorted by linear distance from the user viewing the list to each of the other users 18 within the predefined distance. Each of the users within the predefined distance is identified by first and last name, along with a personal photograph, a call sign and transportation state. Users who are logged into the mobile application but who (i) are outside the predefined distance, or (ii) have polling turned off, or (iii) cannot otherwise be located (.e.g., users logged into the browser applications only); appear at the bottom of the list. Including these users in the list ensures that everyone logged into the system is accounted for. The map view 72v displays all users who are within range of the zoom boundaries on the screen and who have an active position location on a map or satellite representation. Pressing the identification arrow 84 in the upper right hand corner of the map view 72v centers the map on the user operating the mobile client device. As the user moves with the mobile client device, the map remains centered on that individual. The transportation state and call sign of each user is displayed in the map view 72v with an icon for ease of identification.

The radar view 74v is useful for close-in visualization of users 18 and also provides a compass-like orientation to quickly determine pointing directions along which other users are located relative to the client 12 on which the other users 18 are viewed. The range is adjustable by swiping a single finger up and down on the radar screen. In the map and satellite views, the position of the user 18 in possession of the client is indicated with a colored (e.g., blue) dot 88, while other officers are displayed as colored (e.g., green) icons 92 and while ghost users 80 are displayed as orange icons 96. In the radar view, the position of the user is at the center of the radar view while other officers and ghost users are displayed as colored (e.g., green, orange, etc.) dots. Custom color selection for each icon within the Situational Awareness mobile application 28 or within the web applications is an option. The radar view includes the display of a series of concentric rings 92 which are highlighted in different colors to represent the effective firing range of a weapon from the position of each armed user viewed on the display. The two standard concentric ring 92 sizes are fifty yards or meters, which represents a pistol, and three hundred yards or meters, which represents a rifle. The radar view 74v may also be centered on a different user for different perspectives. This helps officers determine whether other officers are potentially within a line of fire or if it is possible to hit an individual or object, provided that other information displayed within the radar view accurately approximates relevant distances. Users for whom the position is considered inaccurate or uncertain may be shown with gray icons.

Figure 6A:
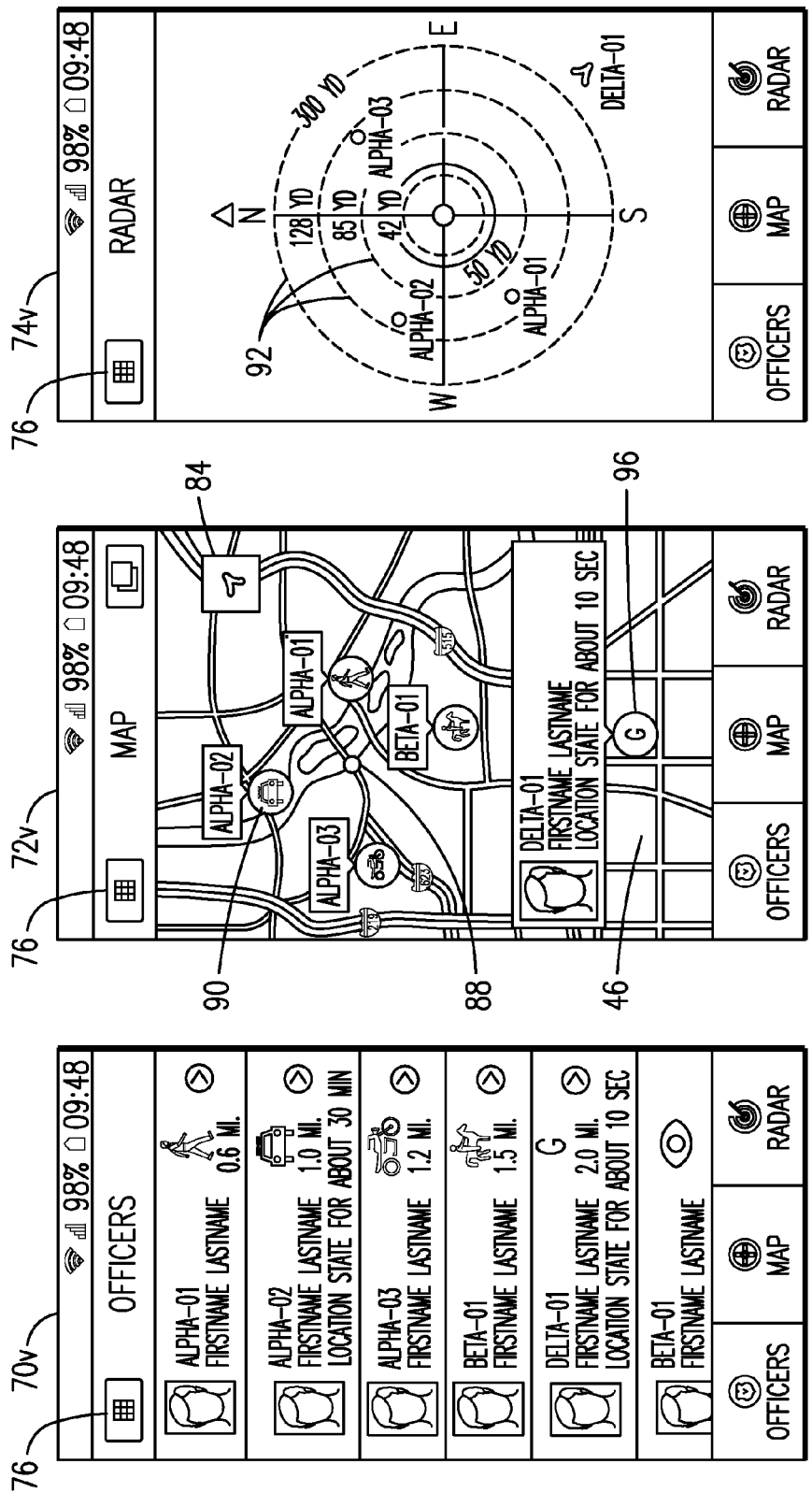
FIGS. 6a and 6b illustrate list, map, radar and officer isolation views for the Situational Awareness Mobile application.
Figure 6B:
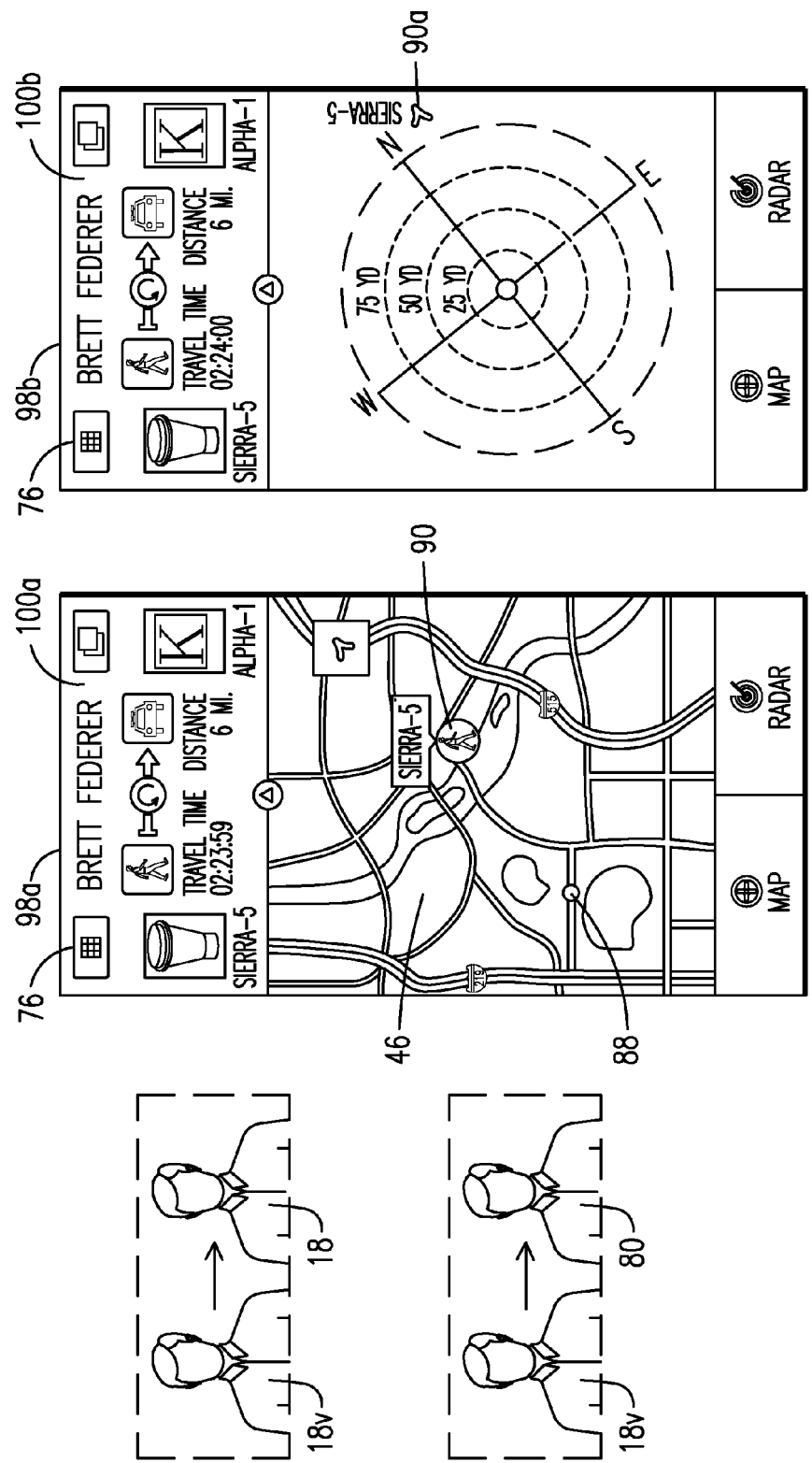

FIG. 6b illustrates an isolation map view 98a of the Situational Awareness Mobile application 28 in which a single user 18 (e.g., officer), represented on the map 46 by the icon 90 is isolated with the viewing user 18v (i.e., the user in possession of the client device which generates the view) represented on the map 46 by the blue user dot 88. Within the isolation radar view 98b the single user 18 is represented by the radar icon 90v and the viewing user 18v is at the center of the radar screen. This de-cluttering allows the viewing user 18v to quickly and easily locate one individual. This can be especially important when the viewing user is in a stressful or distracting environment. To generate an isolation map view 98a for a particular user, the viewing user can click on that individual in the list view 70v. Also, as shown in FIG. 6a, clicking on the icon of an individual user 18 displays a pop-up box for that user which provides the full name, photograph and call sign of the user as well as other useful information. Then, by tapping on that user icon a second time, the display transitions to the isolation view 98. The isolation radar view 98b can be viewed by pressing the radar button at the bottom of the page. The user 18 can move back to the isolation map view by utilizing the map button at the bottom of the page.

Within the isolation view, the viewing user 18*v* can center the map on the individual of interest by pushing the identification arrow 84 towards the upper right hand corner in the map. By accessing a pull-down box 100 in the header at the top of the screen, the user can view additional information about that particular user or the person's location. One advantageous parameter is the ETE (estimated time in route) which is a computation of an estimated amount of time required for that individual to arrive at the viewing user's location, taking into account optimum routing, traffic and transportation state as, for example, made available through Google Maps services. The computation of the ETE is for each of two directions of travel, i.e., from the viewing user to that individual and from the individual to the viewing user.

Returning to FIG. 5, below the list, map and radar view buttons 70, 72, 74, are three relatively small setting option buttons. The first (left-most) setting option button 104 allows the user to update the call sign and photograph. The second (middle) setting option button 106 allows the user to modify the position polling rate which can be adjusted up or down to save battery life. Current polling options in the application range from the fastest position capture, based on the processing characteristics within each mobile device, to periodic position capture at a slow interval setting, e.g. every 60 seconds. The user can also turn tracking off to save battery life or when at locations where it is not important or possible to receive location information. The last (right-most) button 108 of the three on the middle part of the dashboard allows the user to modify the transportation state.

With further reference to FIG. 5, three large buttons 110, 112, 114 on a lower half of the home page 52 incorporate several typical smartphone functions. The left-most button 110 accesses a text note application 110*a*. The middle button 112 accesses a photo capture application 112*a*, and the right-most button 114 accesses a user notebook viewer application 114*a*.

The Situational Awareness system 10 provides a high level of integrated functions resulting from the client-server distributed networking architecture. When a user 18 is logged into the system 10 the applications 110*a*, 112*a* and 114*a* function entirely within the system network and in accord with constraints imposed to control storage and access to the application data. In the disclosed embodiments the constraints are tailored to law enforcement activities and related legal considerations. Specifically, provision of the applications 28 and 38 assures that, after data is generated on the mobile client device, the data cannot be permanently stored or retained on the client device of the user that generated the data. Nor can the data be stored or retained on the client device of a user that is permitted to view the data. Integration of the Situational Awareness Mobile application 28 with the server-based Situational Awareness Information Manager application 38 enables the users 18 to quickly collect and share information and quickly view information shared by other users. The information can be collected as a combination of text and photographs (referred to as photo notes) which are created using the text note button 110 and the photograph capture button 112 on the home page 52. Further, the server-based Situational Awareness Shared Information application 38 enables capture and integration into the system 10 of audio, video, accelerometer and other sensor data, also subject to constraints imposed to control storage and access to the application data. The foregoing data can be viewed with the application 28 by pressing the Notebook button 114.

Figure 7A:
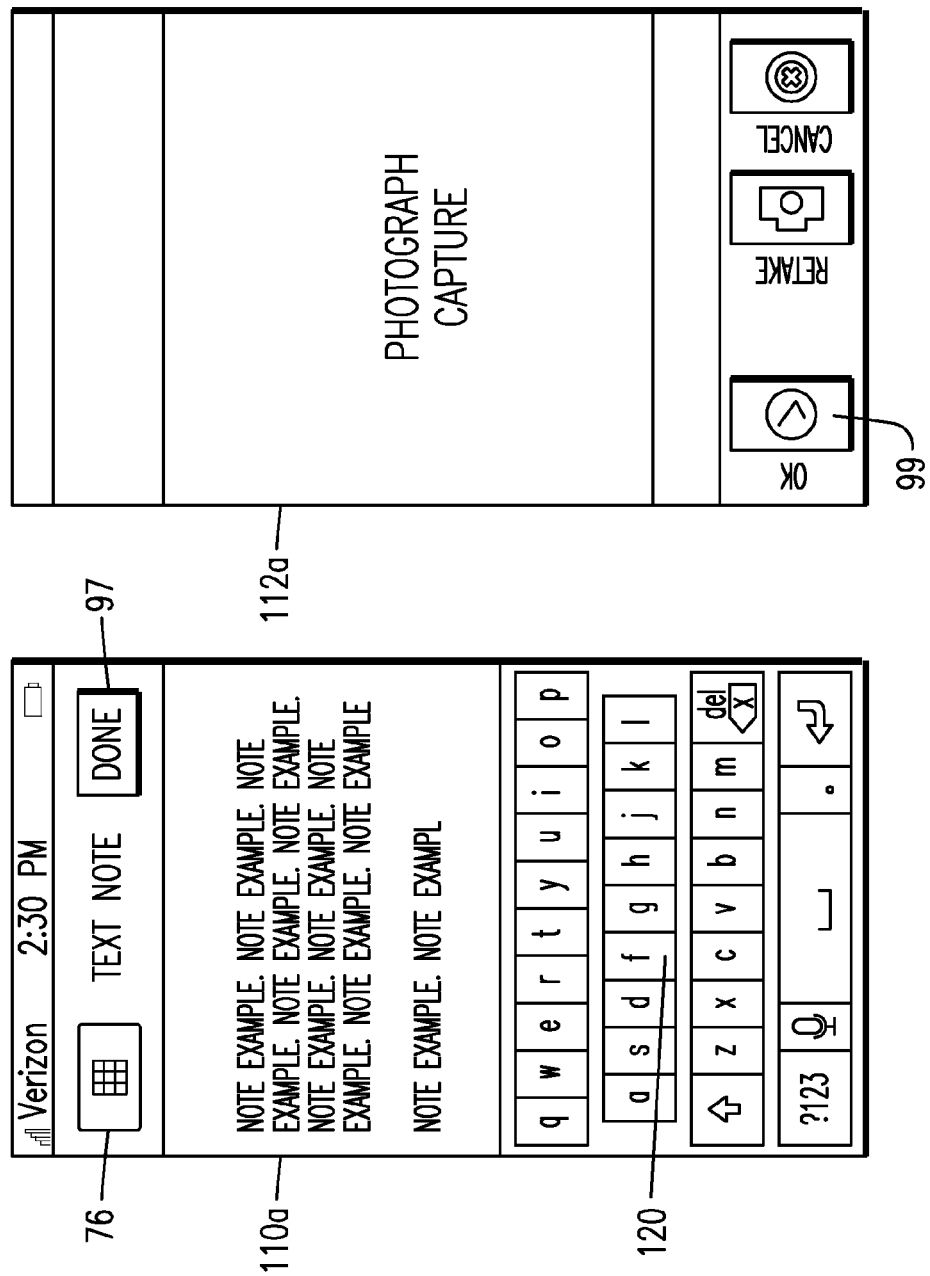
FIGS. 7a, 7b and 7C illustrate text note creation, photo note creation and notebook viewing options of the Situational Awareness Mobile application.
Figure 7B:
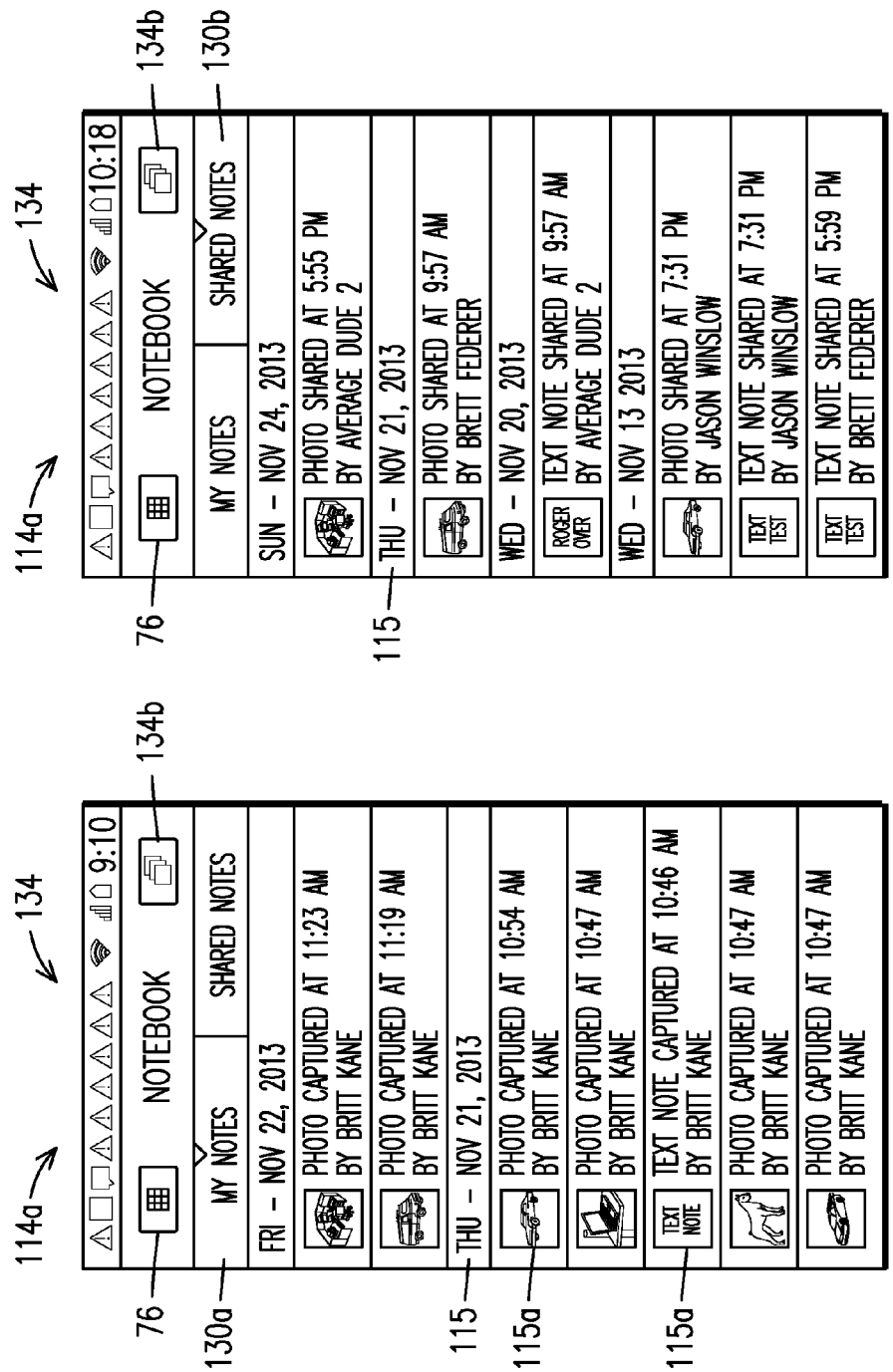

With reference to FIG. 7*a*, the text note application 110*a*, the photo capture application 112*a* and with reference to FIG. 7*b*, the notebook viewer application 114*a* may each be a pre-existing mobile client native software application designed to run on in an original operating mode on the particular client device (to ensure compatibility with the client device), but also configured in a second operating mode which only runs when the application is launched from a screen generated on the display by running the Situational Awareness Mobile application 28. The text entry mode of the text note application 110*a* enables a user 18 to type a note with a graphical keyboard 120 on the touch screen display 60, or to use a speech-to-text option such as is available on many smart phones to generate recordable data. In both cases, the data is retained in volatile memory (e.g., RAM) and presented on the display 60 for the creator to review. The voice-to-text option may require a connection to the internet so that the appropriate OS, e.g. Android, iOS, etc., may correctly interpret the desired entry. After pressing DONE on the touch screen display 60, the text note is uploaded to the server and saved to the database 24, and the display 60 returns to a view of the home page 52. The Situational Awareness Mobile application 28 deploys the native camera application in a reconfigured operational mode, as the photo capture application 112*a*, which mode only runs on the client device when the application is launched from a screen generated on the display by running the Situational Awareness Mobile application 28. Initially, the photo and note data is retained in volatile memory (e.g., RAM) and presented on the display 60 for the creator to review. The user may abort the photograph by using the smartphone back button or by not accepting the photograph in accord with typical operation of a native camera application. Choosing acceptance of the photograph or aborting the photograph results in display of the homepage 52. The client 12 will also attach metadata to the text entry or photograph, e.g. time, data, compass orientation, position, user who has logged into account, phone identification, etc. as further documentation characterizing or authenticating the information and for compliance with reporting requirements of the organization.

Figure 7C:
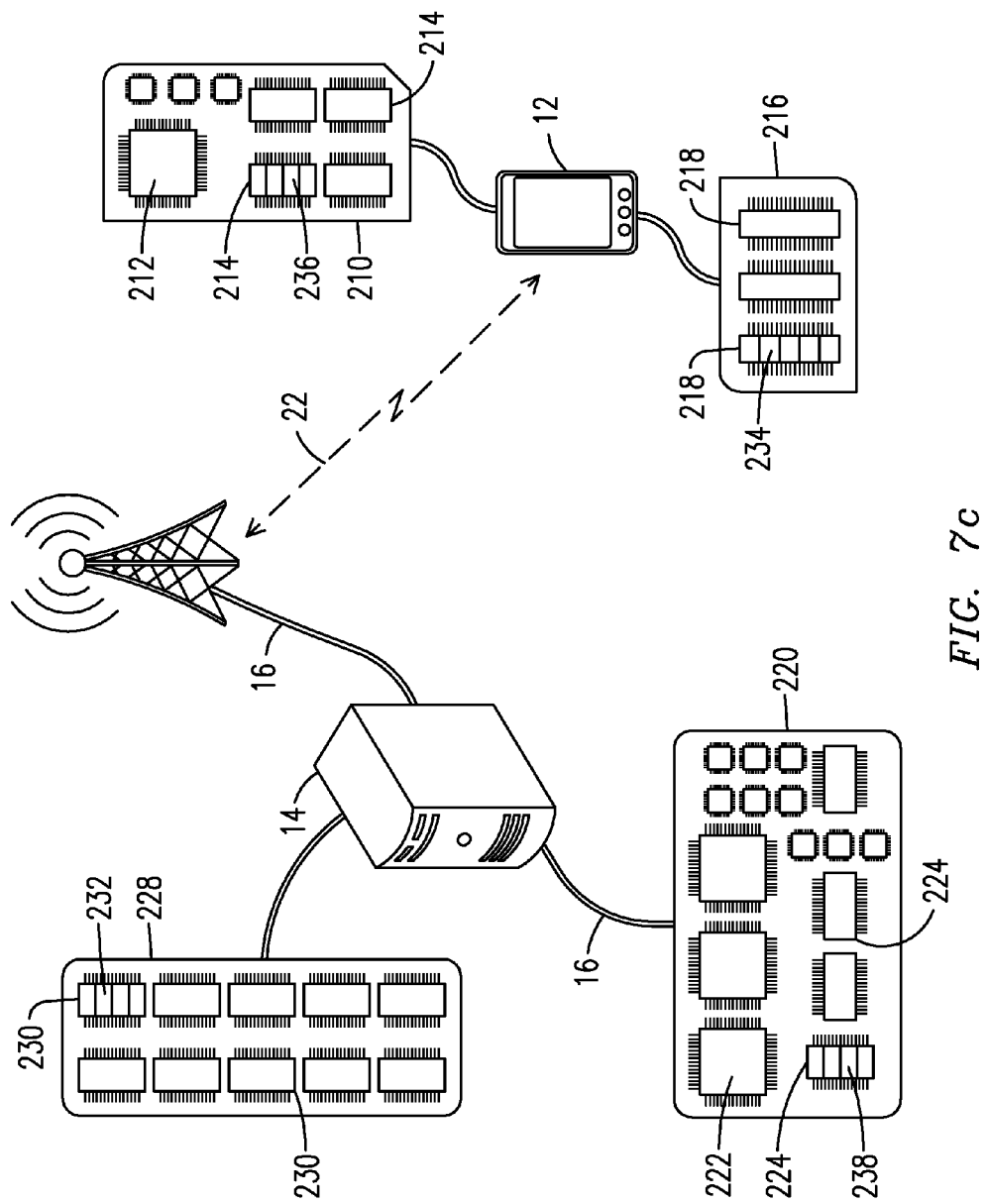

With reference to FIGS. 7*a*, 7*b*, and 7*c*, according to one embodiment of the process, an exchange of information between the server 14 and mobile client 12 occurs after creation of either a text note (e.g. a text file), or a photo note (e.g. an image from a camera). FIGS. 7*a* and 7*b* illustrate the text capture application 110*a*, the photograph capture application 112*a* and the notebook viewer application 114*a*. FIG. 7*c* illustrates components within the server 10, including a server CPU circuit board 220, on which reside a server processor 222 and a volatile memory medium 224, a server storage circuit board 228 with a server non-volatile storage medium 230. FIG. 7*c* also illustrates components within the hand-held client device 12, which consists of a smartphone CPU circuit board 210 with a device processor 212 and a client volatile storage medium 214, also with a client storage circuit board 216 with a resident client non-volatile storage medium 218. Both server non-volatile memory 230 and client non-volatile memory 218 may also reside on their respective CPU circuit boards as well, e.g. 210 and 228. The storage mediums 214, 218, 224 and 230 each have separately addressable memory locations respectively; client volatile addressable memory block 236, client non-volatile addressable memory block 234, server volatile addressable memory block 238 and server addressable non-volatile memory block 232. These separately addressable memory locations may be utilized by the situational awareness system to store data which is not accessible outside the situational awareness system.

Figure 8A:
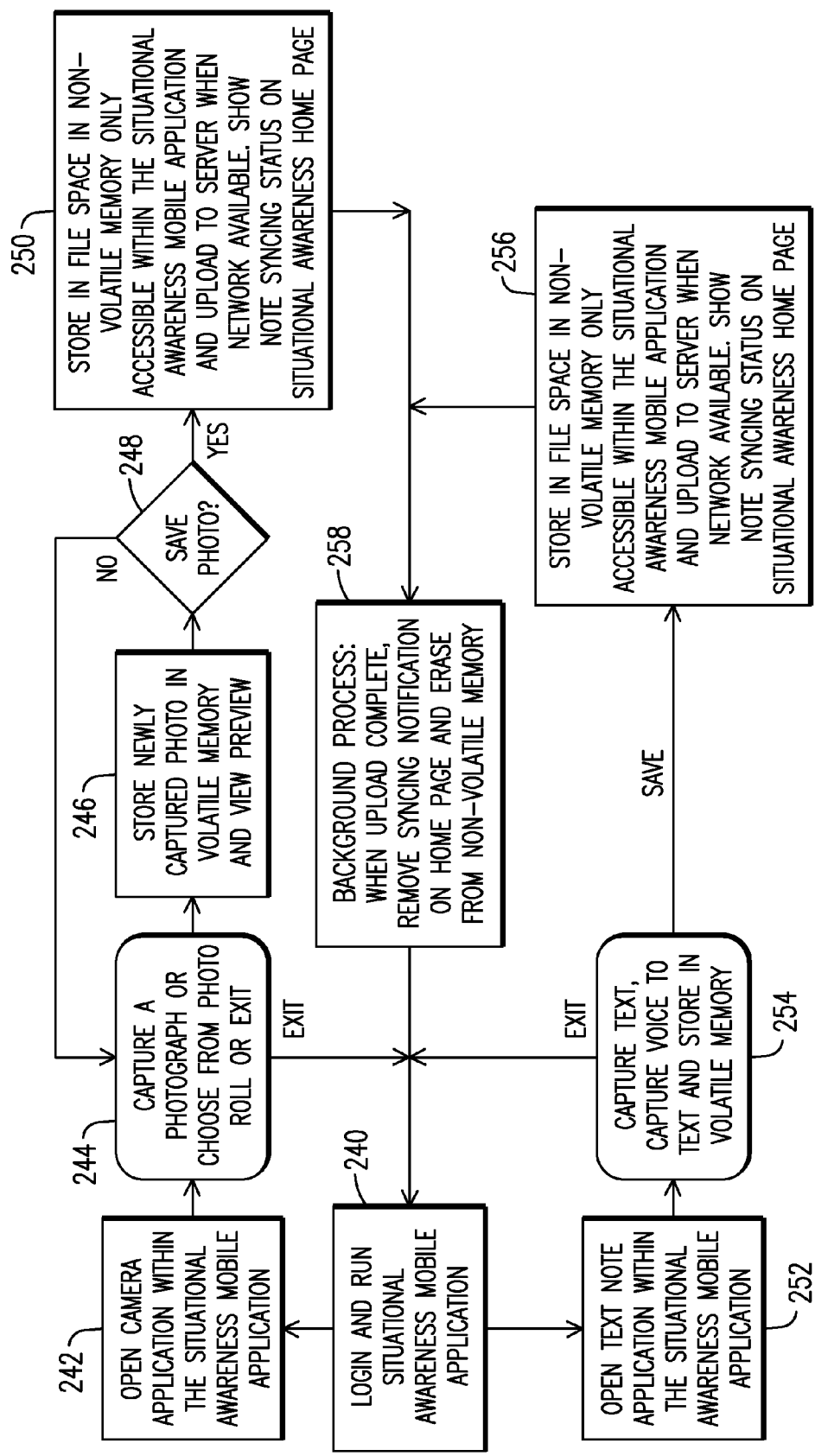
FIGS. 8a and 8b illustrate an exemplary process for text note and photograph creation within the Situational Awareness Mobile application.

FIG. 8 demonstrates the process for capture of a text note or photo image note. Creation of a text note or photo note begins with the selection of capture photograph 242 or capture text note 252 using the client 12 using the text note capture application 110a and a photograph capture application 112a. The text note 110a or the photo note capture application 112a may be an application resident on the client 12 which is utilized within the Situational Awareness Mobile application 28. The text note application 110a or photo note capture application 112a may also be custom built for the Situational Awareness Mobile application. After initial capture is complete for a photograph in step 244 or a text note in step 254, the data is temporarily stored within the client volatile storage medium 214 under the control of the client processor 212 in steps 254 and 246 in a memory storage location known to the Situational Awareness Mobile application 28. At this time the data may be removed from volatile memory 218 (e.g., RAM) in the client device. If the user 18 aborts either process then the text note or photo note is erased or can be overwritten upon next capture from client volatile memory 214. If the user elects to save the text note 254 or the photo note 248, the data is written to the non-volatile memory 218 of the mobile client 12 and stored in a file space on the client non-volatile storage medium only accessible within the Situational Awareness Mobile application 28 as shown in steps 250 and 256. In step 258, the text note or photo note is retained until it is uploaded to the server 14, under control of the server processor 222 to be eventually stored in the server non-volatile storage medium 230. The note is then removed from the client non-volatile memory 218 so that the client processor 212 can no longer directly access the data from the client non-volatile memory 218. To effect uploading the text note or photo note data to the server, the client device initiates a service request to upload the note data to the server. An embodiment of the situational awareness system is to not require the photo note or text note be moved to client non-volatile 218 memory and directly uploaded the data from the client volatile memory 214 (do we want this in here?).

Figure 8B:
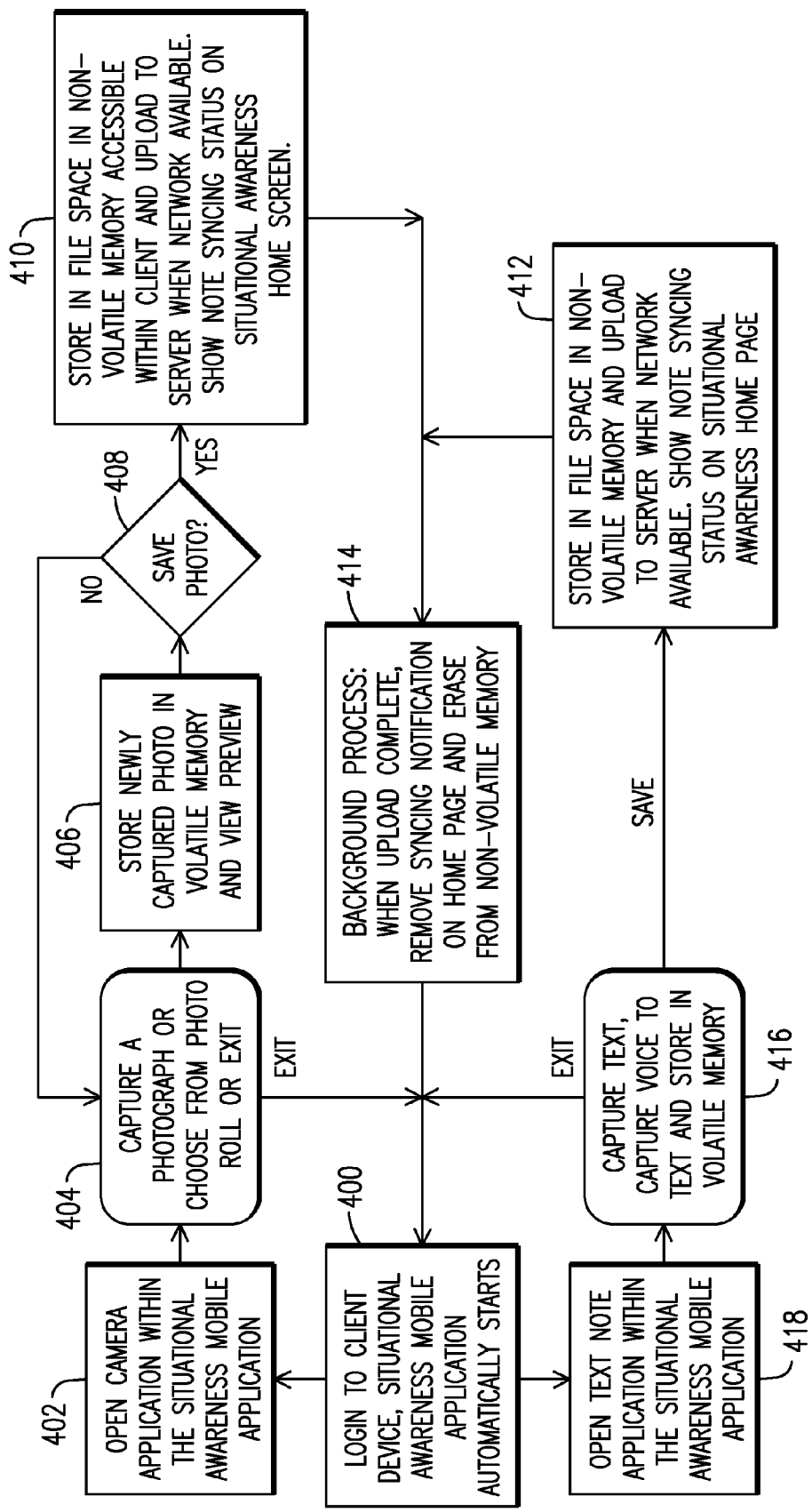

Upload begins immediately if a network connection is available, but if a network connection is not available, the client 12 continually tries to access the server 14 to upload the data. When a network connection is created, and the server is accessed, the server acknowledges that the note data is to be uploaded and establishes a location in the database 24 to store the data within the user's account. The server creates a file access permission matrix which consists of an owner and potential viewers. The owner is the user for whom the client 12 uploaded the data and the viewers are other users first selected by the owner to have access to view the note when the data is initially shared by the owner for the first time. Hence, viewers are the set of, or a subset of, all other users within the organization who have been given access to the note data by the owner. Once the viewer's receive access to the note, they can allow other users access to the data without the owner's permission. Once the note data is uploaded to the database 24, only the owner may delete the note from the database. After the data upload has been confirmed by the server, a message is sent back to the client 12 that the upload is completed and the Situational Awareness Mobile application 28 then deletes the note from the non-volatile memory in the client 12. Visual confirmation of upload activity is shown on the home page 52. The status of the upload process is displayed in the synching notification area 124 in the lower left hand corner of the page 52 as shown in FIG. 5. If an upload is pending or in process, a syncing icon 126 displaying the number of notes waiting to be uploaded will be spinning. When all notes have been uploaded, the syncing icon is no longer spinning and a "No Notes to Synch" message is displayed. FIG. 8b demonstrates a similar process when the mobile client device 18 utilizes only the Situational Awareness Mobile application 28. Login to the client device 18 only allows the user to operate the Situational Awareness application 28 and the need for separate memory allocations is not necessary.

Figure 9A:
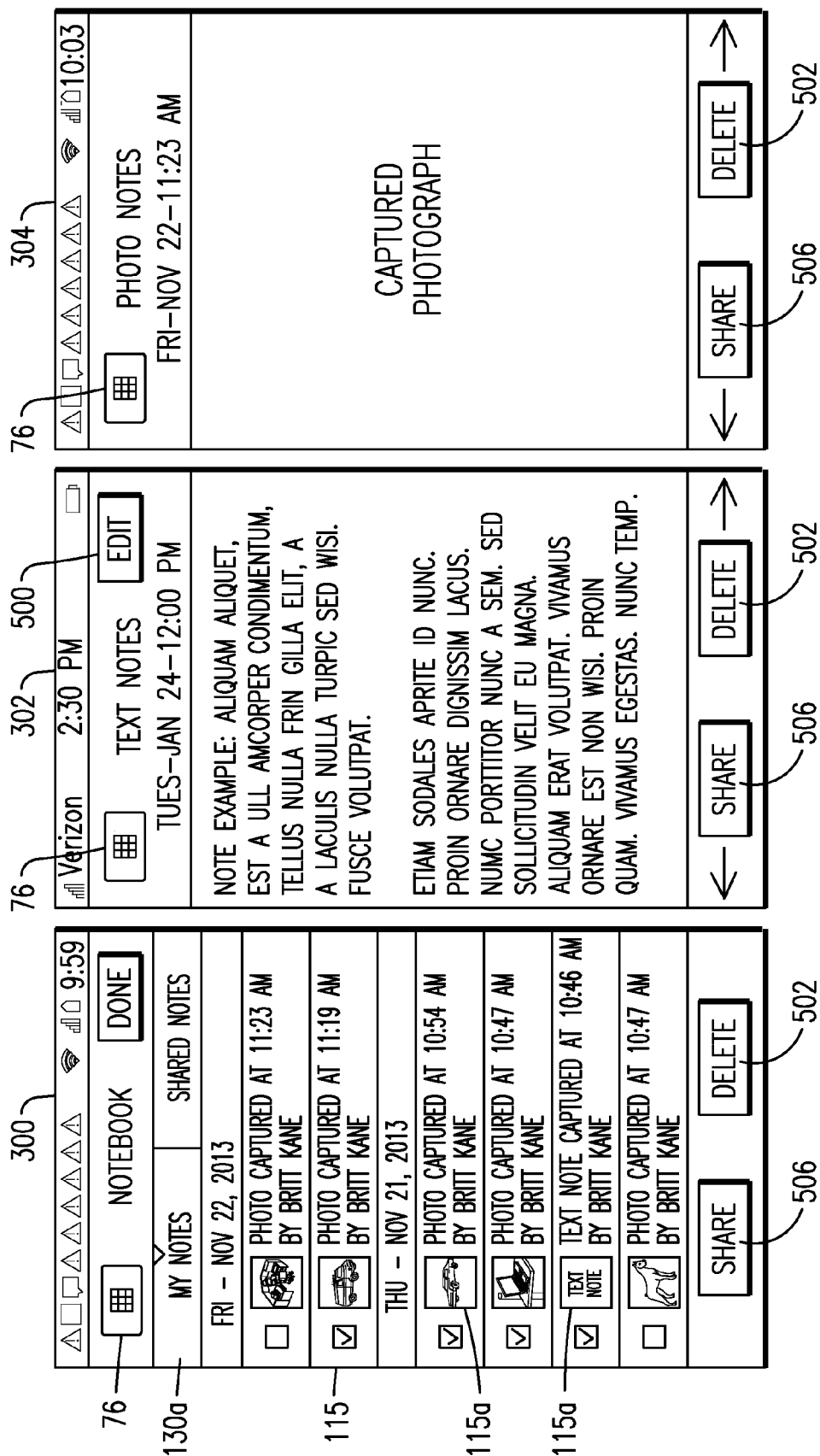
FIGS. 9a, 9b and 9c illustrate how to view shared notes, share notes with other members and receive a notification of shared notes within the Situational Awareness Mobile application.
Figure 9B:
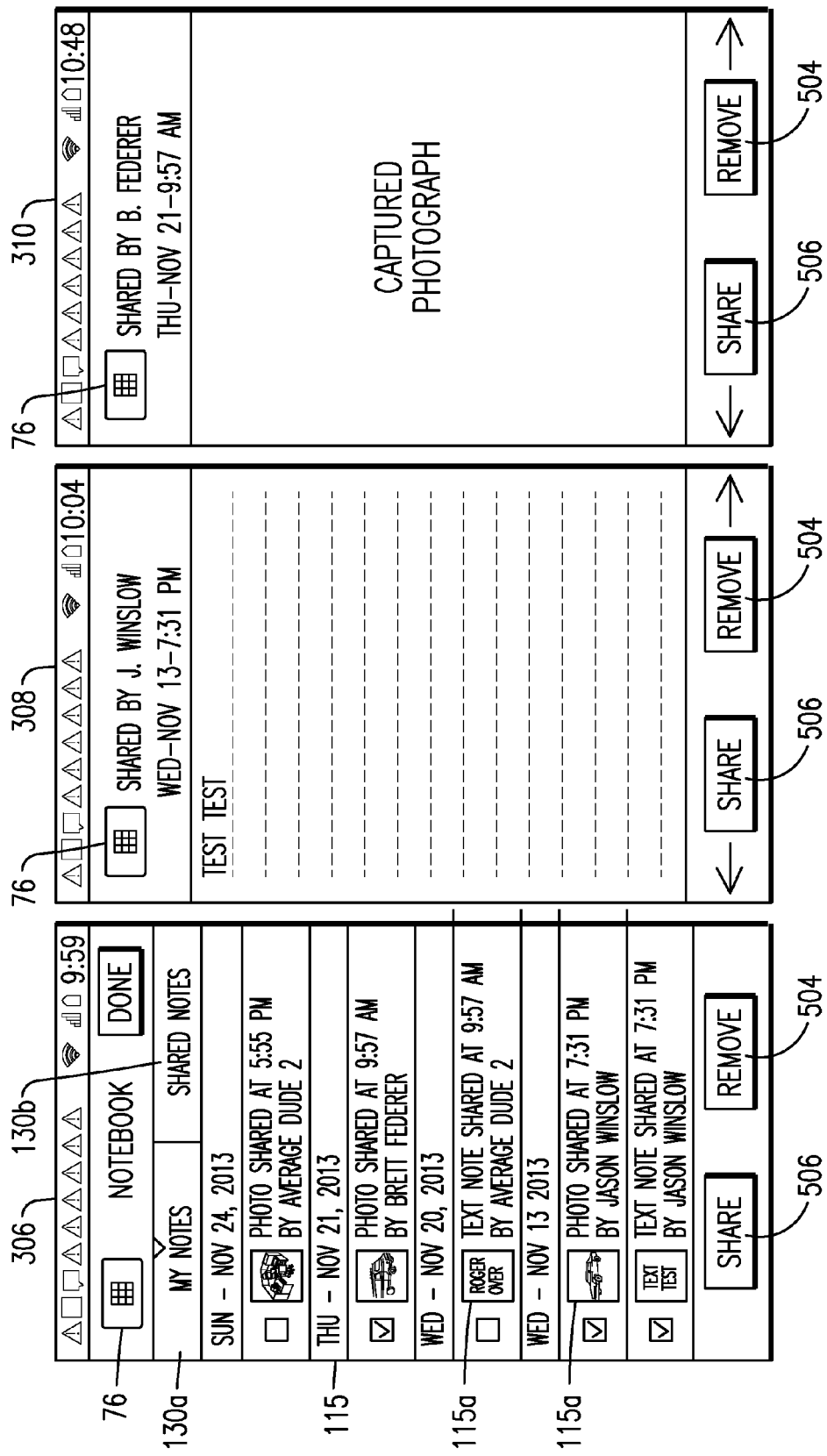

With reference to FIGS. 5 and 7b, the button 114 is used to initiate the notebook viewer application 114a, which presents options to view contents of either a My Notes folder 130a or a "Shared Notes" folder 130b. The My Notes folder 130a provides a line item listing 115 in chronological order of all available notes created by the user 18 of the client 12. This view presents the files in daily groups with each group placed under a header indicating the day, e.g. Monday, Tuesday, etc. and the date, i.e. Nov. 18, 2013 on which each file was created. A listing contains the thumbnail 115a of each photograph or text note, the time of day the note was created as well as the creator's first and last name. If the user would like to see a detailed view of the text or photo note the user created, clicking on that particular listing displays a copy of the note for viewing on the client. With reference to FIG. 9a, text note view 302 displays the entire text note saved on the server 14 and photo note view 304 displays the full size photograph saved on the server 14. If the selection is a text note, the user can edit that note from this view using the edit button 500 in the upper right hand corner of the screen. In an alternative embodiment of the situational awareness system, a history of all edits to the note can be stored in the database for file integrity tracking purposes. The Shared Notes folder 130b contains a line item listing 115 of the files in chronological order of file information similar in nature to the type stored in the My Notes folder 130a, but which data have been provided to the viewing user by other users. In FIG. 7b, the name of the user who has shared the data is shown in each of the listings along with the thumbnail 115a that was shared and the time the note was shared. With reference to FIG. 9b, text note view 308 displays the entire shared text note saved on the server 14 and photo note view 310 displays the full size shared photograph saved on the server 14. In the Shared Notes folder 130b, a viewing user may remove notes from the list seen by the viewing user, but the viewing user cannot delete the note from the server database 24.

Figure 10:
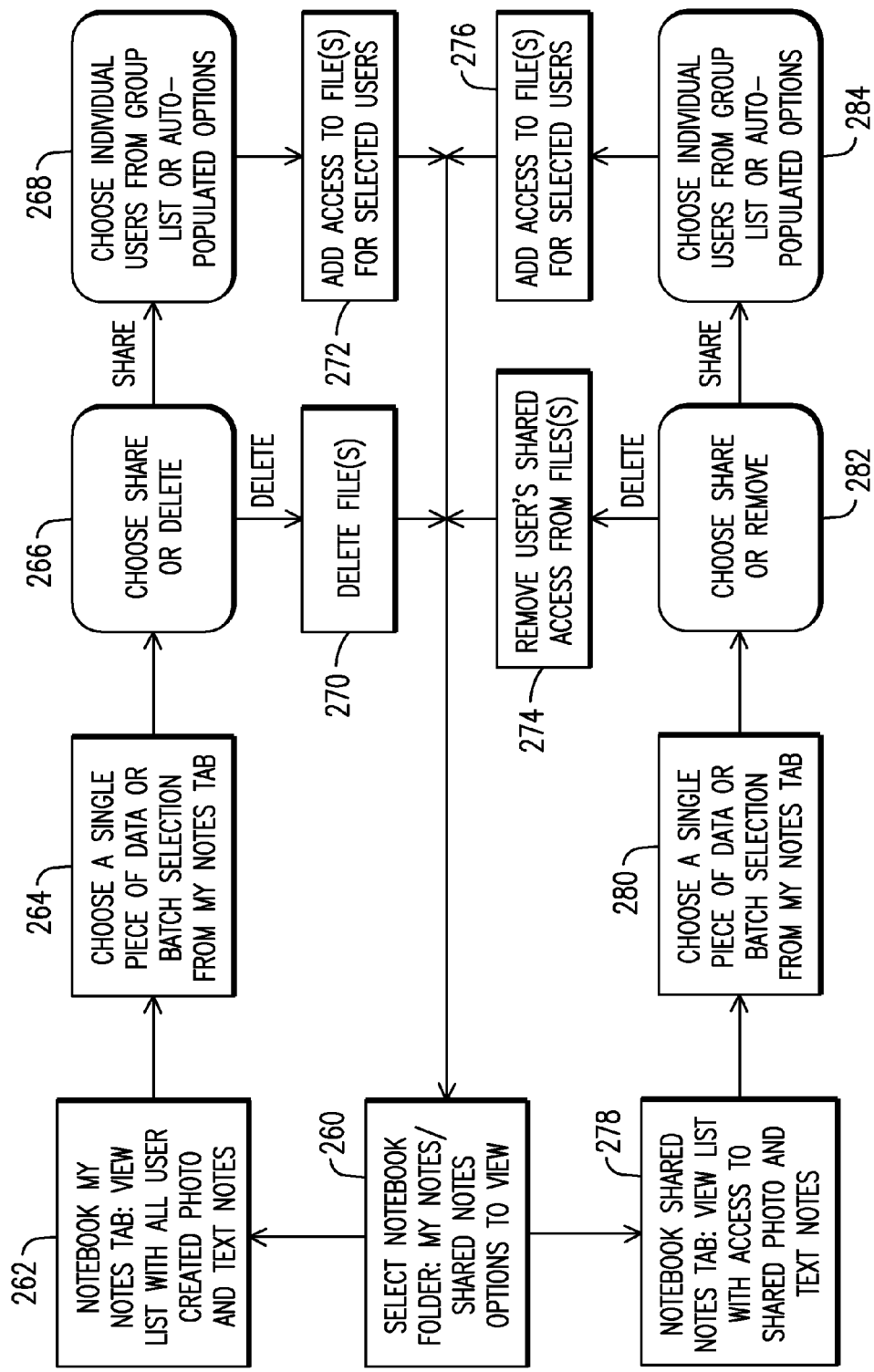
FIG. 10 illustrates a process of note sharing and deletion.

As illustrated in FIG. 9a, both photo and text notes can be deleted in the My Notes folder 130a and as Illustrated in FIG. 9b, within the Shared Notes folder 130b, photo and text notes can only be removed. Removing a note only has the effect of removing access for the viewing user to view the file. Hence, notes can be re-shared with the viewing user as the original copy is not deleted. Text notes that are shared cannot be edited by the viewing user. Both user owned notes and shared notes may be deleted individually or multiple listings can be deleted simultaneously using the batch option 134 accessed with the batch button 134b in FIG. 7b, indicated by three overlapping rectangles. Individual files are selected with check marks as shown in FIGS. 9a and 9b to create a group for the batch operation. As illustrated in FIG. 9a, deletion of individual or multiple listings is processed by pressing the Delete button 502 at the bottom of the any of the three screens 300, 302, 304. With reference to FIG. 9b, removing listings is effected by pressing the Remove button 504 at the bottom of any of the three screens 306, 308, 310. FIG. 10 illustrates options for deleting as well as sharing data in both folders.

Figure 9C:
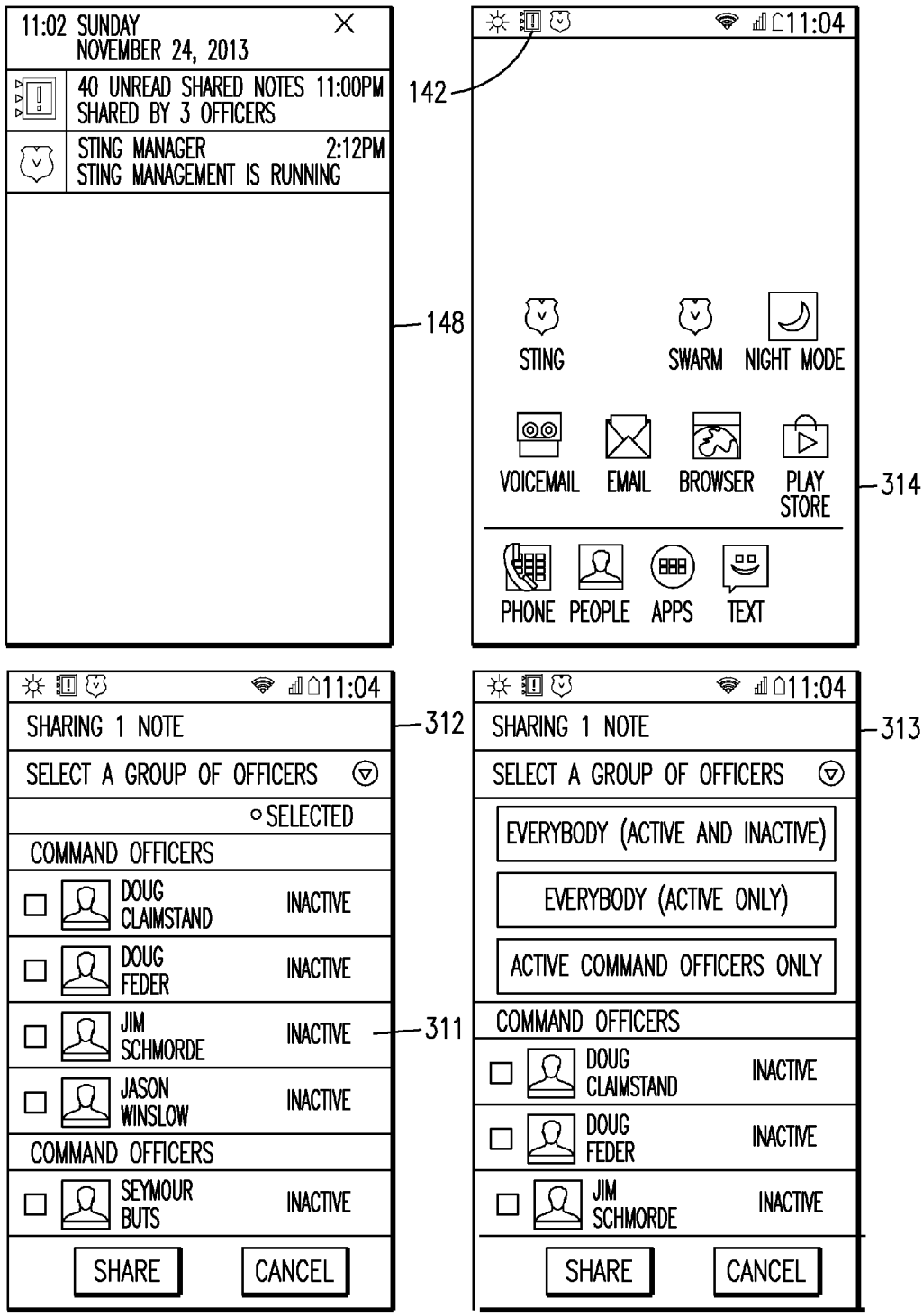

FIGS. 9a and 9b also illustrate note sharing options within the notebook viewer application 114a from both folders. The shared notes may be shared individually using the share button 506 and groups of note files can be shared simultaneously again using the batch option 134 accessed with the batch button 134b. Individual files are selected with check marks as shown in FIGS. 9a and 9b to create a group for the batch operation. Once the information to be shared is selected, the user selects persons to share the information with as shown in the sharing list view screens 313. With reference to FIG. 9c, the persons are selected from a list view of all users 311 who are in the list of individuals in the organization. If other officers are logged into the Situational Awareness system and are actively position polling, they have an ACTIVE status in the list as shown in FIG. 9c, while officers not logged into the Situational Awareness system are designated INACTIVE. In an alternate embodiment of the situational awareness system 10, users 18 (e.g., officers) are either logged into the system, or a different set of user conditions are provided, as the requirement to define the ACTIVE status. The user can select one or several individuals from the list view as recipients of the selected note or, as shown in the sharing list view screen 313, that user may deploy an option to immediately send the selected information to a particular group of officers, e.g. all Active Command users, all Officers (ACTIVE and INACTIVE) or all Officers on-line (only ACTIVE).

Referring to FIG. 10 again, when the sharing REST service request is received at the server from the sharing client 12, the server allows access to the note(s) by other clients 12 based on the corresponding list of users 18 identified by the sharing client and sends a notification to all the clients to be allowed access. In one embodiment this notification to all the clients is effected by sending a notification request to one or more third party providers having access to standard messaging services on the specific client devices (e.g., smartphone) based on the particular OS running on the client, e.g., for an Android, Amazon or Apple product. Each third party service delivers the notification to the phones that shared notes are available with a message created by the situational awareness system which also states the number of unread messages. The Situational Awareness Mobile application 28 also updates the number of unread shared notes displayed on the home page 52.

Referring to FIG. 9c again, when a file has been shared with another client, a red notebook icon 142 is displayed in the task bar at the top of the smartphone screen of the client 12 having received the file, this indicating to the recipient user that a new file has been added to the Shared Notes file in that client device. Accessing the standard notification list on the smartphone will display the shared note notification, along with any other general smartphone notifications that exist. Touching the shared note notification will allow the user to immediately access the Shared Notes folder within the Situational Awareness Mobile application 28.

As shown in FIG. 5, the home page 52 of the Situational Awareness Mobile application 28 displays a touch screen-enabled auto-share button 150 located in the lower right hand corner of the screen by which a user 18 can automatically share created notes to a preselected set of other users 18 (e.g., officers) every time a text or photo note is created. This eliminates a set of steps (e.g., key strokes) which may be beneficial when encountering a threat or requiring quick reaction times.

Figure 11:
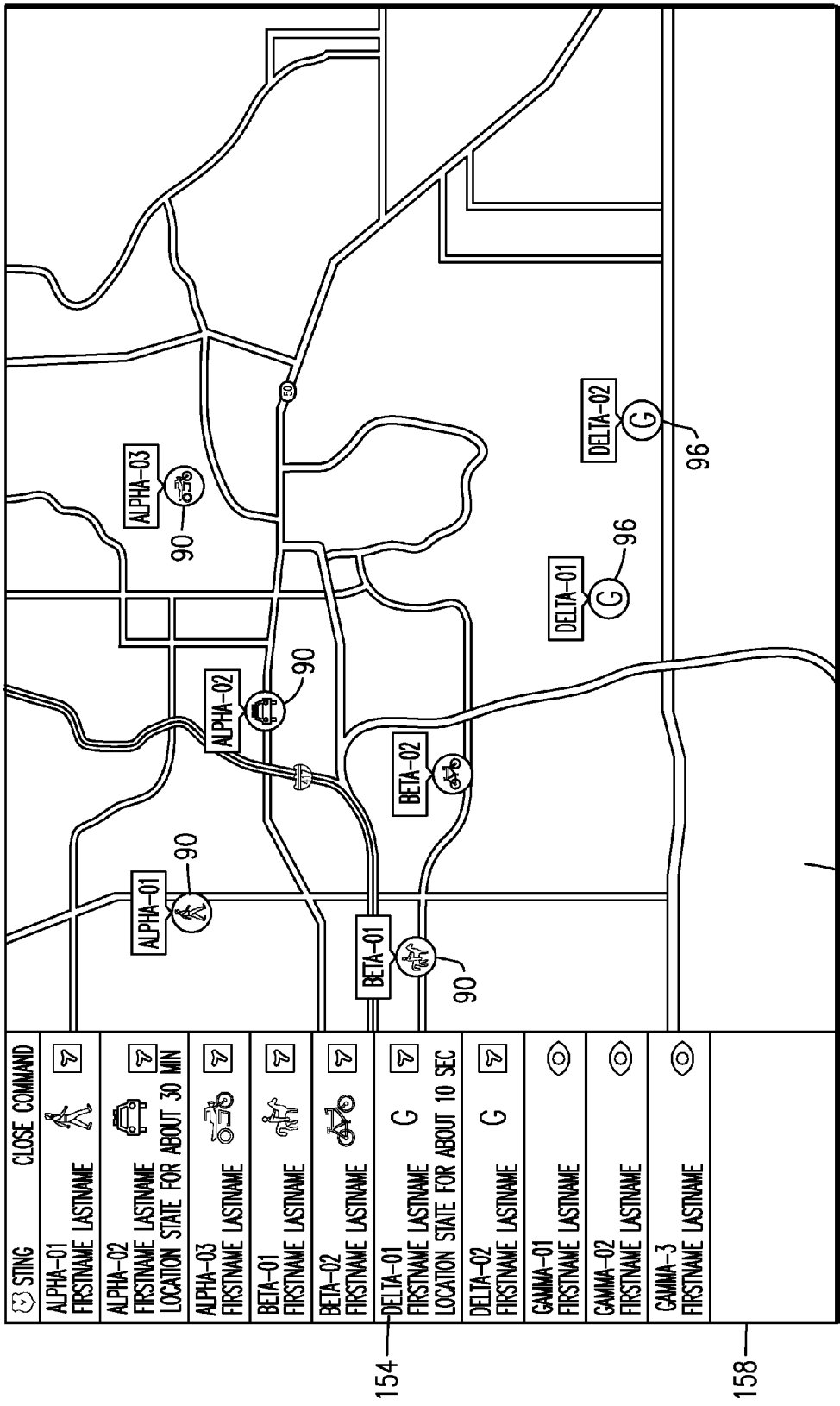
FIG. 11 illustrates a Situational Awareness Map/Roster application.

Shown in FIG. 11 is the Situational Awareness Map/Roster Application 36. This browser application is a display tool useful when large screen sizes are available to view graphic information normally shown on smart phone displays, e.g., when a user wants to visualize greater map and satellite detail or more easily manipulate map information. The Map/Roster Application 36 can be utilized at Command posts, in vehicles and in office environments by supervisors and others who monitor or oversee operations. The application can also be used by law enforcement officers using notebook computers coupled to the network, e.g., via a wireless link, which may be located within department vehicles.

The Map/Roster Command application 36 provides a list 154 of logged-in users 18, including those not actively polling (i.e., not collecting position signals and the location data to a database on the web based platform) and those whose position is uncertain, and a large map displaying all of the active polling users. The map has functionality of the type that exists in well known commercially available applications such as used for satellite imagery, zoom, rotation controls and a street view map option. The list view allows the user to easily find a particular user 18, e.g. a law enforcement officer, or a ghost user 80. Other embodiments provide marker placement and additional information or functions which overlay the map view of the users. These may include breadcrumbs, weather information, drawing overlays, historical data, and remaining battery life of the client device and accuracy or maximum weapon firing range for each displayed user. Another feature of the situational awareness system 28 is the ability to change user profiles or display information as necessary within an operation by other organizational users in other applications, e.g. a supervisor who wishes to change a call sign within an operation of a particular user from the Situational Awareness Map/Roster browser application.

Battery life recording is an important attribute for the entire application. Recording of remaining battery life allows supervisors to know that an asset in the field may get removed from the Common Operating Picture. The supervisors will thus know that the removal was not the result of an officer safety issue or an unknown location. This information can also be used to alert the user 18 carrying the mobile client of a need to get the client to a charging center or plug in optional batteries to restore life to the smart phone. Historical records of the battery life can be used for maintenance and training functions. For example, knowledge of the model of the device and the current discharging profile can alert IT staff to improper operation of the equipment, e.g. due to an aging battery. The data can also be used to determine geographic areas which are more prone to battery life consumption, such as those areas having weak cell tower signals or requiring RF transmission from basements.

With reference to FIG. 12, the effective firing range of a weapon 190 in the possession of a user 18 can be identified by type based on a weapon designation (e.g., pistol, rifle, etc., model, etc.) listed in the user's profile or chosen from a list view. In another embodiment the weapon 190 can be identified by type and model automatically through a RFID tag 196 on the user's firearm. For example, each weapon used in a law enforcement organization may have placed thereon a RFID tag 196 containing identification information for the weapon. The RFID tag 196 is linked to the server 14 through the mobile client 12 of the user 18 in possession of the weapon 190 through a wireless link 194 from the RFID tag 196 to the tag reader 198. One such type of RFID wireless link 194 is based on NFC (Near Field Communications) standards. With the mobile client 12 incorporating a NFC based protocol for the tag reader 198 and a NFC based protocol for the RFID tag 196 placed on the weapon 190, the system would not require any additional hardware. Another embodiment includes a WI-FI based RFID tag 196 on the weapon which would also not require any additional hardware in addition to the mobile client 12. In another embodiment a proprietary RFID tag 196 requires additional hardware to be attached to the mobile client to read the proprietary tag. The RFID tag 196 would then facilitate knowledge of the weapon type to client 12 which would facilitate knowledge of the weapon type to the situational awareness network 10. The server 14 would then assign an effective firing range to the user from the knowledge of the weapon type. The effective firing range would be represented by a ring around the user. Using the maximum firing range of the weapon, other determinations can be made within the situational awareness system. The intersection of a maximum firing ranges of two users on top of the icons could indicate possible fratricide issues that need to be determined. If the position of a target is known, determination of an effective firing range that covers that target can be based on the positions of users 18.

FIG. 2 illustrates how a Covert Mobile application 30 is integrated into the system 10. This application runs on a client device, is in the form of a smart phone or a tablet computer having a wireless communications link and in the possession of non-users. A function of the Covert Mobile application 30 is to report activity information relating to the non-user or the environment about the non-user. A non-user is illustrated as a ghost user 80 in FIG. 2. A ghost user 80 may be a non-officer or undercover officer having covert missions during which there cannot be any access to applications such as shown in FIG. 2, which would identify the person as a law enforcement representative. Examples of individuals who would be provided mobile clients having the covert mobile functionality include confidential informants, hostages, captors, witness protection candidates, and K-9s or other assets being tracked by the law enforcement organization.

The information can be any type of data that can be received from the smartphone. This includes both phone sensor information and various phone states, e.g. position, audio and video data, photographs, compass position, battery life, etc. The non-users, while in possession of a smart phone or other mobile client connected to transmit data to the server or clients in the network, do not have access to, or benefit from, any of the functionality of the other Situational Awareness applications or other resources of the system 10. With activation of the Covert Mobile application 30, the locations of a ghost user 80 carrying the mobile client running this application appears in the Situational Awareness Common Operating Picture (COP). FIGS. 6a and 11 illustrate the presence of a ghost user 80, represented by the ghost user icon 96 alongside law enforcement users 18, represented by user icons 90 on the COP. Map screens of the both the Situational Awareness mobile application 28 and the Map/Roster application 36 display ghost users 80 to logged-in law enforcement users. Covert mobile applications according to one embodiment of the invention are designed to look and operate like other normal consumer applications having functionality different and unrelated to the functionality of the covert application in order to provide inconspicuous operation. More generally, the application could be guised as an icon that appears like a non-functional image on a display, or as any kind of application which can be launched from a touch screen display, e.g., a video game, a travel assist manager, a calculator, a calendar, or other application typically found on a smart phone and that does not appear suspicious.

The user login page to run the Covert Mobile application 30 may be hidden and only manifest on the display when a particular unique gesture combination is provided by an officer. This could result from repetitious tapping on an image, input of a password, or use of a particular finger gesture on the screen display 60, e.g. drawing an x on top of a consumer application, moving 3 fingers up and down the screen 5 times, etc., or a physical movement on the phone, e.g. shaking the phone up and down 5 times, waving the phone in a circle 2 times, etc. In addition to providing a user name and a password, the user 18 seeking to launch the Covert Mobile application 30 will also log the call sign of the individual to be tracked, and the call sign will appear in the Situational Awareness mobile application map view and the Map/Roster application map view to identify the individual. Ending the process of running the covert application can also require input of a password to prevent the non-user individual carrying the mobile client 12 from accidentally or purposely logging out of the application. Covertly acquiring position data, photographs or other information also requires that the utility be usable by other applications without interference. For one embodiment which runs covert location reporting software, based on information provided by a GPS utility, a configuration of the software suppresses display of a GPS indicator while allowing operation of other applications which utilize the GPS functionality (e.g., to provide location information while travelling), and to co-utilize the GPS signal.

FIGS. 13a, 13b, 13c and 13d illustrate a Situational Awareness Information Manager application 160 which actively manages information that a first user 18 has created as well as information being shared with the first user by other users within the organization. Application 160 is used for both real time requirements, e.g. in a command post for an ongoing operation, or in the office or vehicle for after action reports and analysis of data. The application 160 (i) analyzes existing data, including timelines and spatial relationships on a map, (ii) shares any critical data in the user's database with other users in the organization, (iii) creates and downloads information in either raw format (text files or standard photograph output formats such as jpg) or using standard report templates available in the application, and (iv) adds information to existing entries for clarification or accuracy.

The Situational Awareness Information Manager application 160 provides the user 18 with two basic screen views of notes 162 to analyze existing information: a Tile view 164 and a Map view 166. The tile view 164 contains individual thumbnails 170 of all text and photo notes. The thumbnails 170 are displayed chronologically in groups according to a particular date, similar to how data would appear in a law enforcement officer's handwritten notebook. The files may be searched by date selection, i.e., by choosing the desired day or date on a calendar 172 on the left hand side of the application screen. The user can also choose to delete, share or download photo and text notes with button selections 176a, 176b, 176c located at the bottom of each thumbnail 170. Touch screen contact made with individual thumbnails 170 displays more detailed information such as an enlarged photograph or text note entry, location of the information when recorded, and several time metadata tags for accuracy.

Three different time stamps are collected to ensure the note accuracy: (i) the time when a record is made on the mobile device (e.g., a written note or a photograph), (ii) the time recorded when the information is uploaded to the server and (iii) the time when each location is recorded. By using all three types of time stamps, further understanding and improvement in the accounting of events becomes possible. This removes practically all doubt about whether the information was tampered or was not in evidentiary control. The complete list of metadata is displayed for each note 162: Capture Date, Capture Time, Upload Time, Mobile Device MEI Number, Officer Name, Badge Number, Latitude and Longitude, GPS accuracy, GPS capture time, Time Difference between photograph capture and GPS capture, Azimuth of mobile device, Pitch of mobile device and Roll of mobile device. Additional metadata may be included, e.g., altitude, temperature, acceleration, pressure and weather conditions.

Returning to FIG. 13b, the Map view 166 of the Situational Awareness Information Manager 160 displays all data collected for a particular day with pins 180 placed on a map 182 or satellite view. Using the map view, the user can analyze the spatial relationship of all the information. Clicking on an individual pin 180 on the map 182 will display the individual thumbnail 170 of that particular photo or text note. Although not illustrated, the system includes two additional views: a List view and a Timeline view. The List view provides a simplified, line-by-line, chronologically accurate list of photo notes and text notes similar to the notebook view within the Situational Awareness Mobile application. The Timeline View will provide a different visualization of the chronology of events by showing a time axis with notes attached along that axis.

Figure 13A:
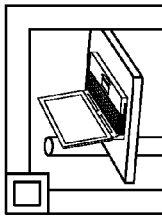
FIGS. 13a, 13b, 13c and 13d illustrate a Situational Awareness Information Manager application.
Figure 13B:
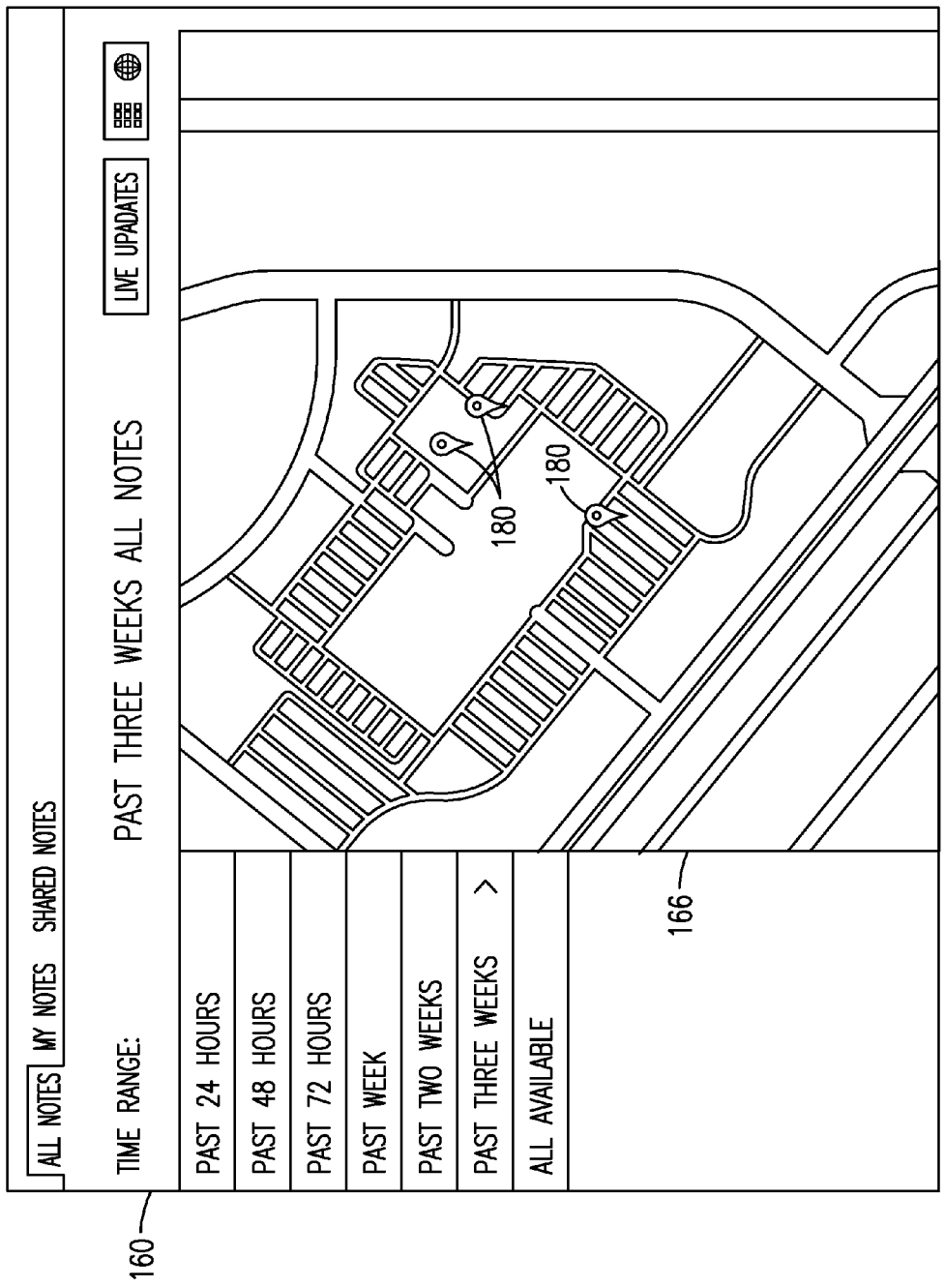
Figure 13C:
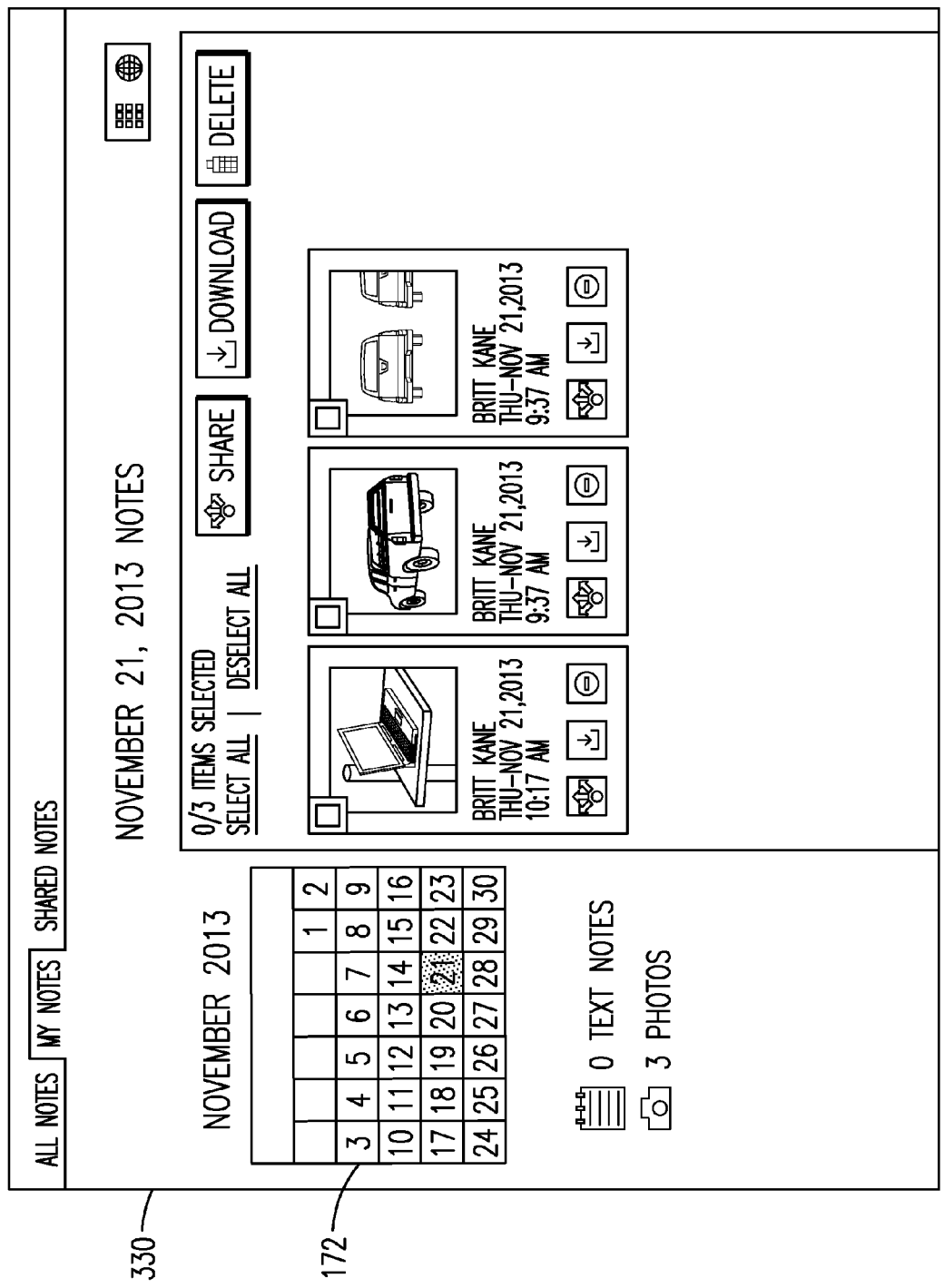
Figure 13D:
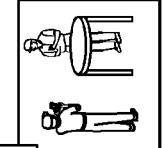

With features of the Situational Awareness Information Manager 160, as illustrated in FIGS. 13a, 13b, 13c and 13d, the user also has access to three folders which contain information: (i) the All Notes folder, which contains by notes created by the user and shared by other users, (ii) the My Notes folder which only contains notes created by the user and (iii) the Shared Notes folder which contains notes only shared by other users. The same Tile views and Map views shown in FIGS. 13a and 13b are provided in all three folders as well. In the All Notes folder a real time information selection is also available. By enabling this selection, the user does not have to refresh the browser manually to view any notes which are created or shared. This automated capability provides a real time operational feed of information from all individuals within the organization. As illustrated in FIG. 13d, the user can select to see all shared notes from all officers or only shared notes from a particular individual within the Shared Notes folder.

All notes can be downloaded to a desktop or laptop either individually or by using a batch process which is initiated by pressing the small box in the upper left hand corner for each note. All photographs and text notes as well as the corresponding metadata for each note will be downloaded. FIG. 14 illustrates an automated report template 200 that can also be obtained from the Situational Awareness Information Manager 160. The report template 200 contains the photograph, a map with a pin of the location where the photograph was captured and the collected metadata. For photo notes, the user 18 may also add a title and additional written information which are added to the report on a second page. FIG. 14 is exemplary of such a report template 200 and also illustrates how data initiated from a client device 12 can be obtained as a printed output for reports, evidence or any similar documentation requirements. An embodiment of the system is an automated collation of several notes with a similar report template 200 into a single report output.

Figure 15:
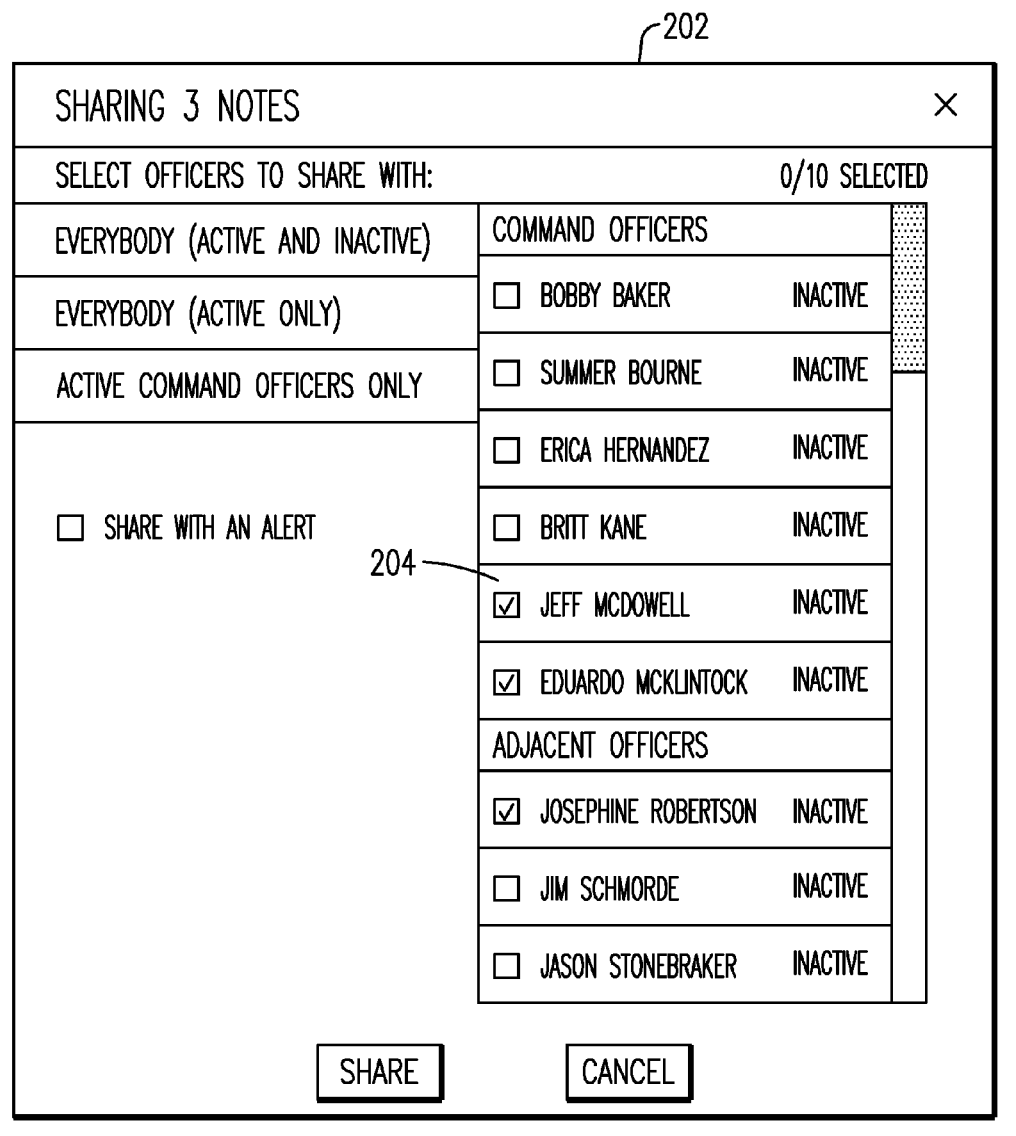

With reference to FIG. 15, the user may also share notes from the Situational Awareness Information Manager with similar functionality as described for the Situational Awareness Mobile application. A user first decides to share an individual note or from a batch selection. Then the user decides on the group of viewers that will receive access to the note.

Accuracy and chain of custody of information is vital to law enforcement operations as well as prosecution of criminal actions. The Situational Awareness system 10 provides a highly automated and integrated approach to generate and preserve relevant data. By using the combination of the Situational Awareness Mobile application on a mobile client to collect information and the Situational Awareness Information Manager application 38 to only analyze data and create concise reports, the users (e.g., law enforcement officers and supervisors) maintain secure control of field intelligence. Officers can use the web based application 38 within the patrol vehicle or at the office with a suitably larger screen in an environment in which they can attend to the collected data with less distraction.

The ability to create a highly accurate accounting of events with the situational awareness system 10 (e.g., by automating data retention processes, by minimizing the handling of data and controlling access to data) improves credibility of the evidence. The situational awareness system 10 also provides enhanced details to records, e.g. multiple time stamps, date stamps, adding location information, orientation of smartphone, etc. while improving efficiencies with which ever greater amounts of useful information can be generated, recorded and authenticated. The situational awareness system 10 also minimizes or removes doubt regarding credibility and accuracy of events and it reduces the time spent preparing information for prosecuting attorneys and court appearances. Improved accuracy made available with the Situational Awareness system also facilitates decisions on whether criminal cases should be brought. When cases are brought, the data generated through the situational awareness system 10 improves the credibility of evidence acquired through the system 10 and later used in legal proceedings.

Often routine procedures and coordinated operations, e.g. crowd control, SWAT missions or narcotics stings, require creation of post-action reports. Post action reports often require time consuming efforts to collect and amalgamate all of the information participating officers generate, with much of the information having to be recalled from personal memory. The situational awareness system 10 enables rapid acquisition of and access to the data to assimilate credible and pertinent information. The preserved data includes time-dated field notes relied upon when the officer is preparing detailed reports. Since the post-action reports could be generated hours after an incident, the auto-generated data can be especially useful when constructing detailed time lines of key events and when using location information to track movements and locations of key real-time intelligence.

Including time and location information with photographs greatly enhances credibility of evidence and the operational efficiency for the officers. In contrast to use of the situational awareness system 10, it is conventional that all such descriptions be provided over voice communications with a radio. With the situational awareness system 10, the use of inefficient voice communications can be limited to emergency communications while data transfer with the situational awareness system 10 avoids significant errors (e.g., errors in location information).

The Situational Awareness system 10 enables unparalleled improvement in accuracy over conventional law enforcement operations. The ability to write time-dated text notes of actions and to record time-dated photographs of events within the situational awareness Mobile application 28 allows the officer to more efficiently and precisely record important details. With automated inclusion of time, date and location information into the data collection process via the application 10, the need to manually write down or remember critical ancillary details (e.g., time, date, location or compass orientation) associated with written notes is eliminated. The situational awareness system 10 elevates this information to a business record status, improves credibility of the information and reduces the possibility that recordation of this information may be overlooked. Automatic recording of this information, using a combination of phones utilities and on board sensors, increases the value of the acquired information and, hence, the demand for such information. Other information which an officer can record with the situational awareness system 10 includes temperature and acceleration data.

There has been described a system which comprises a series of applications, suited to run on mobile devices, and a series of web-based applications for which functionality and processing are optimized. The native applications and the web-based applications are coordinated to optimize processes of acquiring, storing and disseminating data for speed, integrity and security. The applications running on the mobile devices include the Situational Awareness Mobile application, which is a peer to peer information sharing tool; and a covert tracking application to display covert or non-law enforcement assets on the Situational Awareness COP (Common Operating Picture) displayed on both the mobile and browser applications. The applications running on the server platform which can be accessed by any terminal utilizing a web browser include a Roster/Map application, a real time expanded COP of all users (e.g., officers) and assets; an Information Manager, a tool which analyzes and enables sharing of notes that are synched to a server by the Situational Awareness Mobile application (e.g., officers can download notes with meta-tags into existing report templates); and a System Administration application, through which user (e.g., officer) profiles within an organization are added and managed.

Advantageously, the situational awareness system can utilize smart phones as clients on existing commercial cellular networks and deploy the aforedescribed mobile applications on those devices. The system also deploys web applications into an existing IT infrastructure and operates with most advanced web browsers on desktops, laptops or tablets. Communication may be encrypted using advanced TLP/SSL. A secure remote cloud based server performs all complex situational awareness system computing tasks and houses the database. A firewall appliance may be networked in front of the server for added security. An option also exists to deploy the system on internal Public Safety IT hardware.

The invention claimed is:

1. A method of providing information to one or more members in a group of users, each user having a hand-held device which communicates as a client to a server in a network via a rf link, the hand-held devices each having a volatile storage medium for temporary data storage, a display for viewing information present in the device memory circuit, a device processor and a non-volatile storage medium for data storage for which access to read data from and write data to the device non-volatile storage medium is under the control of the device processor, the server having a processor and a non-volatile server storage medium for which access to read data from and write data to the non-volatile server storage medium is under the control of the server processor, the method comprising:

creating data on a first of the hand-held devices with the data written to the volatile storage medium of the first device or to the non-volatile storage medium of the first device and displayed to the user after creation;

after writing the data to the volatile storage medium of the first device or the non-volatile storage medium of the first device, uploading the data to the server and causing the server processor to write the data to the non-volatile server storage medium; and after uploading the data to the server, limiting further access to place the data in the volatile storage medium of the first device for viewing on the device display by requiring, each time a user in possession of the first device seeks to present the data on the display of the first device for viewing, that the data only be accessed from the non-volatile storage medium under the control of the server processor and sent to the volatile storage medium of the first device without writing of the data into any non-volatile storage medium directly accessible by the device processor wherein the data received by the first device from the server can be viewed on the device display but cannot be stored in any non-volatile storage medium in the first device.

2. The method of claim 1 wherein the step of uploading includes communicating from the first hand-held device to the server whether to permit certain ones of the other hand-held devices among the group of users to display the data.

3. The method of claim 1 wherein the step of communicating from the first hand-held device to the server includes providing to the server identification of one or more of the hand-held devices on which display of the data is to be enabled.

4. The method of claim 2 wherein, after enabling other ones of the hand-held devices among the group of users to display the data, limiting access by at least one of the other hand-held devices to place the data in the device memory circuit for viewing on the display of the other device by requiring, each time a user in possession of the other device seeks to present the data on the display of the other device for viewing, that the data only be accessed from the storage medium under the control of the server processor and sent to the memory circuit of the other device without writing of the data into any storage medium directly accessible by the processor of the other device and wherein the data received by the other device from the server cannot be stored in any nonvolatile storage medium in the other device.

5. The method of claim 1 wherein the step of creating data on the first of the hand-held devices includes creating a text file or creating an image with a camera.

6. The method of claim 1 wherein the step of creating data on a first of the hand-held devices includes writing the data to the non-volatile storage medium of the first device, the method further including, after uploading the data to the server, removing the data from the non-volatile storage medium of the first device.

7. The method of claim 1 wherein the step of creating data on the first of the hand-held devices is performed with a software application running on the device processor and accessible to the user of the first device in at least two different configurations, wherein (i) the volatile storage medium of the first device includes multiple blocks of entirely different memory storage locations, and wherein each configuration is assigned a block of storage locations in the volatile storage medium of the first device different from the block of storage locations in the volatile storage medium of the first device assigned to the other configuration; or (ii) the non-volatile storage medium of the first device includes multiple blocks of entirely different memory storage locations, and wherein each configuration is assigned a block of storage locations in the non-volatile storage medium of the first device different from the block of storage locations in the non-volatile storage medium of the first device assigned to the other configuration.

8. The method of claim 7 wherein the two different configurations can be used simultaneously.

9. The method of claim 7 wherein the data created with the software application is text data or photographic image data, the method including sharing the text data or image data with other users by allowing the other users to receive the data from the server.

10. The method of claim 1 wherein the data created on the first hand-held device is text note data or photo image data, the data uploaded to the server is a file containing all of the text note data or photo image data, and the step of limiting further access to place the text note or photo image data in the volatile storage medium of the first device for viewing, by requiring that the data only be accessed from the non-volatile storage medium under the control of the server processor, requires that the entire file only be accessed from the non-volatile storage medium under the control of the server processor while a portion of the file is stored on, and accessible by the processor of the first device from, the non-volatile storage medium of the first device.

11. The method of claim 10 wherein the portion of the file includes data for displaying on the first device a thumbnail view of the contents of the entire file.

12. The method of claim 1 wherein, as the data are created, the data are written to the volatile storage medium of the first device, the method further including, after creating the data, temporarily storing the data in the non-volatile storage medium of the first device.

13. The method of claim 1 wherein, after removing the data from the non-volatile storage medium of the first device, the first device remains logged into the network so that the data received by the first device from the server can be viewed on the display of the first device and the data received by the first device from the server cannot be stored in any storage medium in the first device while the first device continues to remain logged into the network.

* * * * *